(12) United States Patent
Vigderman et al.

(10) Patent No.: US 10,202,828 B2
(45) Date of Patent: *Feb. 12, 2019

(54) SELF-DEGRADABLE HYDRAULIC DIVERSION SYSTEMS AND METHODS FOR MAKING AND USING SAME

(71) Applicant: Weatherford Technology Holdings, LLC, Houston, TX (US)

(72) Inventors: Leonid Vigderman, Houston, TX (US); Rajesh K. Saini, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/257,830

(22) Filed: Apr. 21, 2014

(65) Prior Publication Data

US 2015/0300131 A1 Oct. 22, 2015

(51) Int. Cl.

| E21B 43/02 | (2006.01) |
|---|---|
| E21B 33/138 | (2006.01) |
| C09K 8/508 | (2006.01) |
| C09K 8/516 | (2006.01) |
| C09K 8/524 | (2006.01) |
| C09K 8/528 | (2006.01) |
| C09K 8/536 | (2006.01) |
| C09K 8/575 | (2006.01) |
| C09K 8/60 | (2006.01) |

(Continued)

(52) U.S. Cl.
CPC ............ *E21B 43/02* (2013.01); *C09K 8/5086* (2013.01); *C09K 8/516* (2013.01); *C09K 8/524* (2013.01); *C09K 8/528* (2013.01); *C09K 8/536* (2013.01); *C09K 8/5755* (2013.01); *C09K 8/605* (2013.01); *C09K 8/725* (2013.01); *C09K 8/74* (2013.01); *E21B 33/138* (2013.01); *C09K 2208/24* (2013.01); *C09K 2208/26* (2013.01)

(58) Field of Classification Search
None
See application file for complete search history.

(56) References Cited

U.S. PATENT DOCUMENTS

| 2,196,042 A | 4/1940 | Timpson .................... 23/11 |
| 2,390,153 A | 12/1945 | Kern .......................... 260/72 |
| 2,805,958 A | 7/1959 | Bueche et al. ............. 106/308 |

(Continued)

FOREIGN PATENT DOCUMENTS

| CA | 2125513 | 1/1995 | |
| DE | 4027300 | 5/1992 | ............ B10D 53/14 |

(Continued)

OTHER PUBLICATIONS

Mar. 23, 2017 Extended EPO Report.

*Primary Examiner* — Andrew Sue-Ako
(74) *Attorney, Agent, or Firm* — Vorys, Sater, Seymour and Pease LLP

(57) ABSTRACT

Systems and methods for treating formation intervals including forming a low permeability layer on a surface of the interval and pumping a treating fluid, where the treatment fluid is diverted through the layer permitting improved treatment uniformity across the formation or intervaland permitting a longer interval to be treated, where the layer comprises self-degradable material that degrade over time without harm to the formation or interval surfaces.

21 Claims, 16 Drawing Sheets

PLA Filter Cake Study

(51) Int. Cl.
*C09K 8/72* (2006.01)
*C09K 8/74* (2006.01)

(56) References Cited

U.S. PATENT DOCUMENTS

| | | | |
|---|---|---|---|
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,724,549 A * | 4/1973 | Dill | C09K 8/66 166/281 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,385,935 A | 5/1983 | Skjeldal | 106/607 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,325,921 A * | 7/1994 | Johnson | C09K 8/08 166/280.1 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,465,792 A | 1/1995 | Dawson et al. | 166/295 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,539,044 A | 7/1996 | Dindi et al. | 524/570 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,001,887 A | 12/1999 | Keup et al. | 516/118 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Synder et al. | 507/266 |
| 6,063,972 A | 5/2000 | Duncum et al. | 585/15 |
| 6,069,118 A | 5/2000 | Hinkel et al. | 507/277 |
| 6,110,875 A * | 8/2000 | Tjon-Joe-Pin | C04B 24/38 166/246 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,055,628 B2 | 6/2006 | Grainger et al. | 175/66 |
| 7,186,353 B2 | 3/2007 | Novak | 252/70 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |

(56) References Cited

U.S. PATENT DOCUMENTS

| | | | |
|---|---|---|---|
| 7,517,447 B2 | 4/2009 | Gatlin | 208/236 |
| 7,565,933 B2 | 7/2009 | Kippie et al. | 166/372 |
| 7,566,686 B2 | 7/2009 | Kippie et al. | 507/213 |
| 7,712,535 B2 | 5/2010 | Venditto et al. | 166/308.2 |
| 7,767,628 B2 | 8/2010 | Kippie et al. | 507/102 |
| 7,829,510 B2 | 11/2010 | Gatlin et al. | 166/295 |
| 7,886,824 B2 | 2/2011 | Kakadjian et al. | 166/300 |
| 7,915,203 B2 | 3/2011 | Falana et al. | 507/138 |
| 7,932,214 B2 | 4/2011 | Zamora et al. | 507/202 |
| 7,942,201 B2 | 5/2011 | Ekstrand et al. | 166/246 |
| 7,956,017 B2 | 6/2011 | Galtin et al. | 507/238 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegem et al. | 166/270 |
| 8,028,755 B2 | 10/2011 | Darnell et al. | 166/379 |
| 8,034,750 B2 | 10/2011 | Thompson et al. | 507/273 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |
| 8,141,661 B2 | 3/2012 | Kakadjian et al. | 175/69 |
| 8,158,562 B2 | 4/2012 | Wilson, Jr. et al. | 507/238 |
| 8,172,952 B2 | 5/2012 | Wanner et al. | 134/22.11 |
| 8,220,546 B2 | 7/2012 | Kakadjian et al. | 166/305.1 |
| 8,258,339 B2 | 9/2012 | Falana et al. | 562/572 |
| 8,273,693 B2 | 9/2012 | Schwartz | 507/238 |
| 8,287,640 B2 | 10/2012 | Zamora et al. | 106/677 |
| 8,362,298 B2 | 1/2013 | Falana et al. | 562/590 |
| 8,466,094 B2 | 6/2013 | Kakadjian et al. | 507/229 |
| 8,475,585 B2 | 7/2013 | Zamora et al. | 106/677 |
| 8,507,412 B2 | 8/2013 | Lukocs et al. | 507/238 |
| 8,507,413 B2 | 8/2013 | Wilson, Jr. | 507/240 |
| 8,524,639 B2 | 9/2013 | Falana et al. | 507/202 |
| 8,530,394 B2 | 10/2013 | Gatlin et al. | 507/239 |
| 8,563,481 B2 | 10/2013 | Gatlin et al. | 507/203 |
| 8,714,283 B2 | 5/2014 | Gatlin et al. | 175/69 |
| 8,720,571 B2 * | 5/2014 | Dusterhoft | C09K 8/50 166/285 |
| 8,728,989 B2 | 5/2014 | Kakadjian et al. | 507/221 |
| 8,772,203 B2 | 7/2014 | Schwartz | 507/128 |
| 8,835,364 B2 | 9/2014 | Thompson et al. | 507/267 |
| 8,841,240 B2 | 9/2014 | Kakadjian et al. | 507/240 |
| 8,846,585 B2 | 9/2014 | Falana et al. | 507/233 |
| 8,851,174 B2 | 10/2014 | Zamora et al. | 166/295 |
| 8,871,694 B2 | 10/2014 | Zamora et al. | 507/238 |
| 8,899,328 B2 | 12/2014 | Zamora et al. | 166/285 |
| 8,932,996 B2 | 1/2015 | Falana et al. | 507/128 |
| 8,944,164 B2 | 2/2015 | Veldman et al. | 166/276 |
| 8,946,130 B2 | 2/2015 | Zamora et al. | 507/204 |
| 8,950,493 B2 | 2/2015 | van Petegem et al. | 166/308.2 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2007/0298977 A1 * | 12/2007 | Mang | C08F 6/22 507/219 |
| 2008/0139416 A1 * | 6/2008 | Rimassa | C09K 8/508 507/241 |
| 2009/0062157 A1 * | 3/2009 | Munoz, Jr. | C04B 26/02 507/219 |
| 2009/0078418 A1 | 3/2009 | Dusterhoft | |
| 2009/0078419 A1 * | 3/2009 | Dusterhoft | C09K 8/50 166/295 |
| 2010/0252262 A1 | 10/2010 | Ekstrand et al. | 166/280.1 |
| 2010/0305010 A1 | 12/2010 | Falana et al. | 507/274 |
| 2010/0311620 A1 | 12/2010 | Kakadjian et al. | 507/136 |
| 2011/0001083 A1 | 1/2011 | Falana et al. | 252/178 |
| 2011/0005761 A1 * | 1/2011 | Luo | C09K 8/035 166/308.2 |
| 2011/0177982 A1 | 7/2011 | Ekstrand et al. | 507/201 |
| 2011/0240131 A1 | 10/2011 | Parker | 137/13 |
| 2012/0071367 A1 | 3/2012 | Falana et al. | 507/103 |
| 2012/0073813 A1 | 3/2012 | Zamora et al. | 166/285 |
| 2012/0097893 A1 | 4/2012 | Wanner et al. | 252/184 |
| 2012/0273206 A1 | 11/2012 | Zamora et al. | 166/308.1 |
| 2012/0279727 A1 | 11/2012 | Kakadjian et al. | 166/386 |
| 2012/0295820 A1 | 11/2012 | Falana et al. | 507/128 |
| 2012/0302468 A1 | 11/2012 | Falana et al. | 507/110 |
| 2012/0325329 A1 | 12/2012 | Schwartz | 137/1 |
| 2013/0081820 A1 | 4/2013 | Falana et al. | 166/308.1 |
| 2013/0096038 A1 | 4/2013 | Kim et al. | 507/221 |
| 2013/0175477 A1 | 7/2013 | Falana et al. | 252/389.23 |
| 2013/0233546 A1 * | 9/2013 | Liang | C09K 8/512 166/285 |
| 2013/0270012 A1 | 10/2013 | Kakadjian et al. | 175/65 |
| 2013/0274151 A1 | 10/2013 | Kakadjian et al. | 507/204 |
| 2013/0312977 A1 | 11/2013 | Lembcke et al. | 166/311 |
| 2013/0331301 A1 | 12/2013 | Falana et al. | 507/105 |
| 2014/0087977 A1 | 3/2014 | Kim et al. | 507/225 |
| 2014/0128294 A1 | 5/2014 | Gatlin et al. | 507/110 |
| 2014/0128308 A1 | 5/2014 | Levey et al. | 510/188 |
| 2014/0166285 A1 | 6/2014 | Santra et al. | 166/292 |
| 2014/0262287 A1 | 9/2014 | Treybig et al. | 166/305.1 |
| 2014/0262319 A1 | 9/2014 | Treybig et al. | 166/371 |
| 2014/0303048 A1 | 10/2014 | Kakadjian et al. | 507/236 |
| 2014/0315763 A1 | 10/2014 | Kakadjian et al. | 507/115 |
| 2014/0318793 A1 | 10/2014 | van Petergem et al. | 166/305.1 |
| 2014/0318795 A1 | 10/2014 | Thompson et al. | 166/308.5 |
| 2014/0323360 A1 | 10/2014 | Comarin et al. | 507/111 |
| 2014/0323362 A1 | 10/2014 | Falana et al. | 507/127 |
| 2015/0007989 A1 | 1/2015 | Tan et al. | 166/279 |
| 2015/0011440 A1 | 1/2015 | Zamora et al. | 507/202 |
| 2015/0051311 A1 | 2/2015 | Zamora et al. | 523/130 |
| 2015/0068747 A1 | 3/2015 | Hwang et al. | 166/280.2 |
| 2015/0072901 A1 | 3/2015 | Samuel et al. | 507/104 |
| 2015/0087561 A1 | 3/2015 | Falana et al. | 507/102 |
| 2015/0087562 A1 | 3/2015 | Falana et al. | 507/102 |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2005194148 A | 7/2005 | |
| WO | WO9409254 A1 | 4/1994 | |
| WO | WO 98/56497 | 12/1998 | |
| WO | WO 2009141308 | 11/2009 | C09K 8/528 |

* cited by examiner

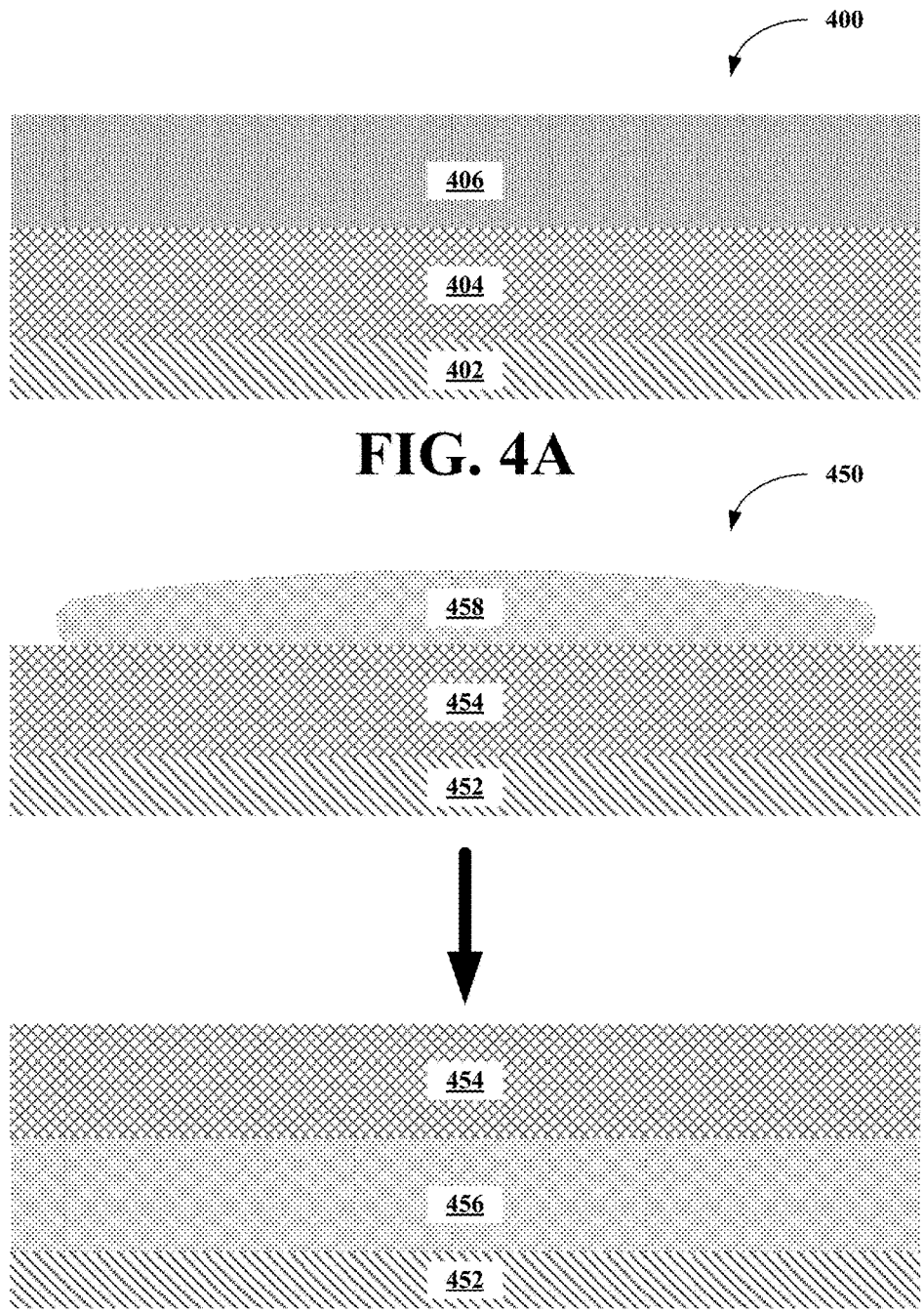

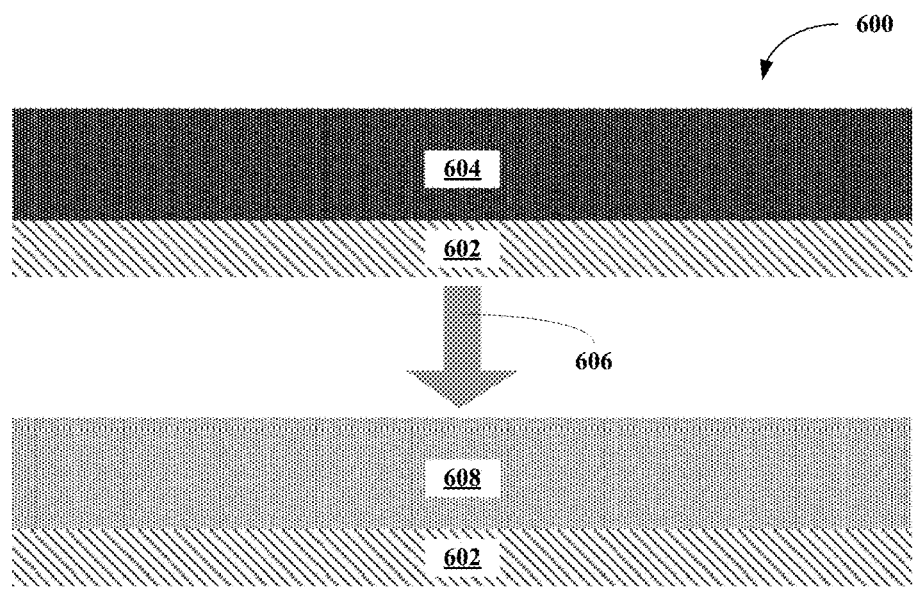
FIG. 6
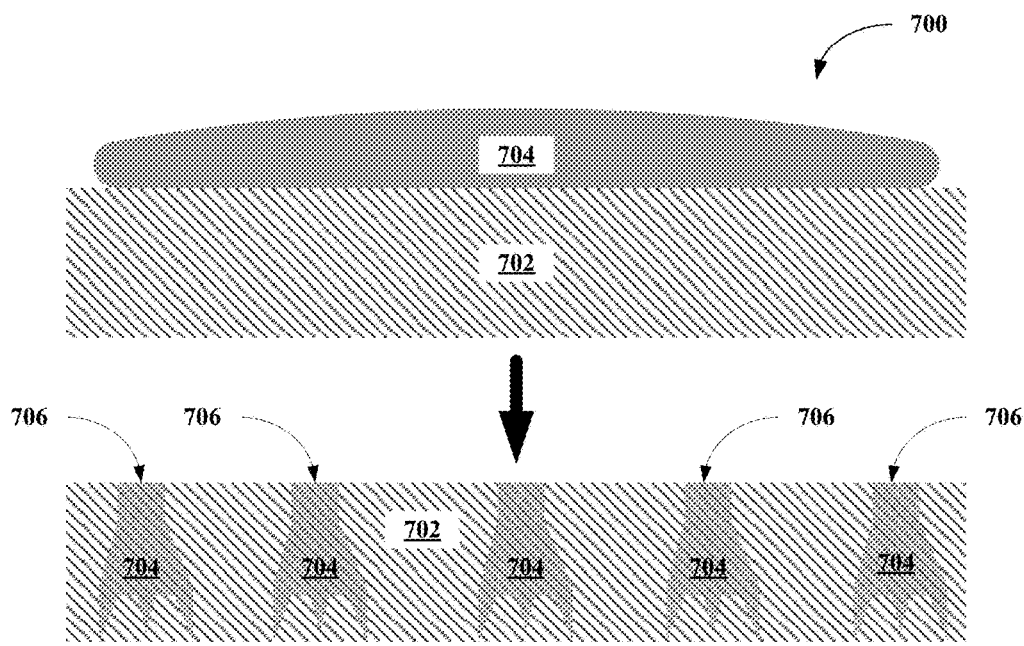
FIG. 7 – Prior Art

SELF-DEGRADABLE HYDRAULIC DIVERSION SYSTEMS AND METHODS FOR MAKING AND USING SAME

BACKGROUND OF THE INVENTION

1. Field of the Invention

Embodiments of the present invention relates to filter compositions, formation surfaces including a filter composition of this invention, methods for forming a self-degradable filter cake, a self-degradable filter layer, or a plurality of self-degradable filter layers on surfaces of a formation or zone thereof, and systems including a well having zones including a self-degradable filter cake or filter layers of this invention, where the self-degradable filter layers include components that erode or dissolve without the need for a separate fluid treatment to cause erosion or dissolution.

More particularly, embodiments of the present invention relates to filter compositions, formation surfaces including a filter composition of this invention, methods for forming a filter cake, a filter layer, or a plurality of filter layers on formation surfaces of a formation or zone thereof, and systems including a well having zones including a filter cake or filter layers of this invention, where the filter compositions including one or more (one or a plurality of) erodible or dissolvable components and where the erodible or dissolvable components erode or dissolve without the need for a separate fluid treatment to cause erosion or dissolution.

2. Description of the Related Art

Correct placement of a chemical treatment such as sand or water control treatments is often complicated by the presence of largely varying permeability zones which are often seen in long horizontal wells. High permeability zones, in particular, may take a large portion of the treatment, leading to insufficient treatment of the rest of the formation. Certain prior filter cakes require a separate treatment to remove the filter cake which may lead to compatibility issues with the well treatments such as sand control treatment fluid or may increase the cost or complexity of the job. Furthermore, as the filter cake is removed, the uneven permeability of the formation may be re-established, leading to uneven coverage with the degradation treatment and thus incomplete filter cake dissolution. Dealing with high permeability "thief" zones has been typically achieved through the injection of particulate materials, foams, plugs, packers, or blocking polymers such as crosslinked gels. Particulate materials that have been pumped include waxes, naphthalene, oil-soluble resins, degradable polymers, and others materials as described more fully in U.S. Pat. Nos. 4,527,628A; 8,109,335B2; 3,724,549A; 3,302,719A; 4,005,753A and United States Published Application Nos. 20110005761A1 and 20120138303A1. These particulate systems are generally used to seal a high permeability zone after a treatment, which then diverts the next round of treatment away from that zone. This process is then applied again until treatment is complete.

As can be seen in the referenced patents, particulate diverting agents (both degradable and non-degradable) are known. However, in these cases, the diverting agent is used to seal a particular, high permeability portion of the formation so that other, lower permeability portions of the formation can be treated. This process can be repeated multiple times.

On the other hand, in this invention, pumping a filter composition of this invention will form a filter cake or filter layers across the entire formation. The filter cake or layer will have a controlled permeability that partially or substantially equalizes the effective formation permeability so that well treatments may be delivered to all formation zones equally with equal effectiveness. Therefore, the well treatment will actually occur through the filter cake or layer across the entire or a majority portion of a formation or zone or zones thereof, rather than the filter cake or layer being used to seal off segments of the formation and then divert away from them.

SUMMARY OF THE INVENTION

Embodiments of this invention provide systems including a well bore having a producing formation, a producing interval, or producing intervals or an injection formation, an injection interval, or injection intervals and a self-degradable diversion layer or a plurality of self-degradable diversion layers formed on the formation or interval surfaces or in the annular space between the formation or interval surfaces and the surface of production tubing. The layers are engineered to have controlled permeabilities and are constructed of materials that degrade and/or dissolve over time so that the layers are temporary and once degraded, leave the formation surface substantially unharmed. The layers create a reduced permeability filter cake on the formation or interval surfaces allowing chemical treating solutions to be more evenly distributed across the formation/interval and permitting a greater degree of controlling the uniformity of the treatment across the entire formation/interval. The reduced permeability of the layers are due to the nature of the materials used to form the layers and the thickness of the layers and the uniformity of the layer thickness across the formation/interval. Additionally, once formed, the layer, which are self-degradable materials in the layer change over time eventually being substantially or completely removed from the surfaces. That is, the treating composition used to form the layers include self-degradable components, i.e., the components degrade, erode, and/or dissolve over time in contact with production fluids or other fluid generally encountered in oil and/or gas well. These components materials being self-degradable, do not require a treating step to remove the layers.

Embodiments of this invention also provide methods for diverting well treatments, including forming a self-degradable diversion layer or a plurality of self-degradable diversion layers on a surface of a producing formation, interval, or intervals or an injection formation, interval, or intervals, annular space between the formation/interval surfaces and production tubing surfaces. In embodiments, where the formation/intervals include a screen assembly, a gravel pack, and/or a sand pack, the layers may formed on the surface of the assembly or pack or may flow through the assembly or pack and form between the assembly or pack and the formation/interval surface or forms in the formation/interval facing portion of the assembly or pack. Once the self-degradable diversion layer or layers have been placed, which may be performed prior to and/or during treatment, a treating fluid is pumped into the formation, where the fluid passes through the layer(s) penetrating into the formation/interval distributing the treating fluid in a more uniform manner so that the formation/interval is treated in a substantially uniform or uniform manner. In certain embodiments, the methods include forming or placing the layers prior to a well treatments such as a sand control treatment. In other embodiments. the methods include forming or placing the layers with a composition including self-degrading components prior to a sand or water control treatment followed by exposing the layers to a solution designed to increase a rate of self-degradation of the self-degrading components. In other embodiments, the methods may also include one or more interval isolation packers so that different portions of the intervals may be treated separately; however, the diversion layers are designed and engineered so that isolation would not be necessary as the diversion layer insure that the flow of fluid through the diversion layers will be substantially uniform or uniform across all intervals including high and low permeability zones. In other embodiments, the intervals are associated with producing formations, while, in other embodiments, the intervals are associated with injection formations. In other embodiments, the methods may also include preparing a layers that are more permanent substantially permanent to permanent, but may be engineered so that the permeability of the layers change over time. The more permanent layers are especially well suited for injection wells.

Embodiments of this invention also provide methods and systems for diverting well treatments including providing filter cake composition including sized, selectively dissolvable/removable particles capable of forming predictable low permeability filter-cake layer or layers. The methods and systems also include engineered placement of particles to form the filter-cake that create a predictable low permeability filter-cake layer or layers on a surface of a producing formation, a producing formation interval or producing formation intervals or an injection formation, an injection formation interval or injection formation intervals, annular space between the interval surface and production tubing surface, on screen assembly and/or gravel or sand packs, where the filter-cake placement may occur with a Newtonian fluid or a non-Newtonian fluid. The methods and systems also include using a leak-off model to design the treatment fluid placement, where the layer or layers act to divert the treating fluid so that the treating fluid is more uniformly introduced into the formation resulting in a more uniform formation treatment. The methods and systems also include filter-cake removal either by using a filter-cake removal composition or by in situ acid generation or by minimal lift-off pressure as fluids is produced from formation interval, or intervals. In the case of injection formation, the layers may be permanent or substantially permanent or may be removed by treating the formation with a filter-cake removal composition or by in situ acid generation.

BRIEF DESCRIPTION OF THE DRAWINGS

The invention can be better understood with reference to the following detailed description together with the appended illustrative drawings in which like elements are numbered the same:

FIGS. 4A&B depict other embodiments of diverted formations and methods for preparing them.

FIG. 6 depicts another embodiment of a diverted formation and a method for preparing same.

FIG. 7 illustrates a prior art treatment of a formation, where a diverting layer was not deposited on the formation prior to treatment.

DEFINITIONS USED IN THE INVENTION

Figure 1:
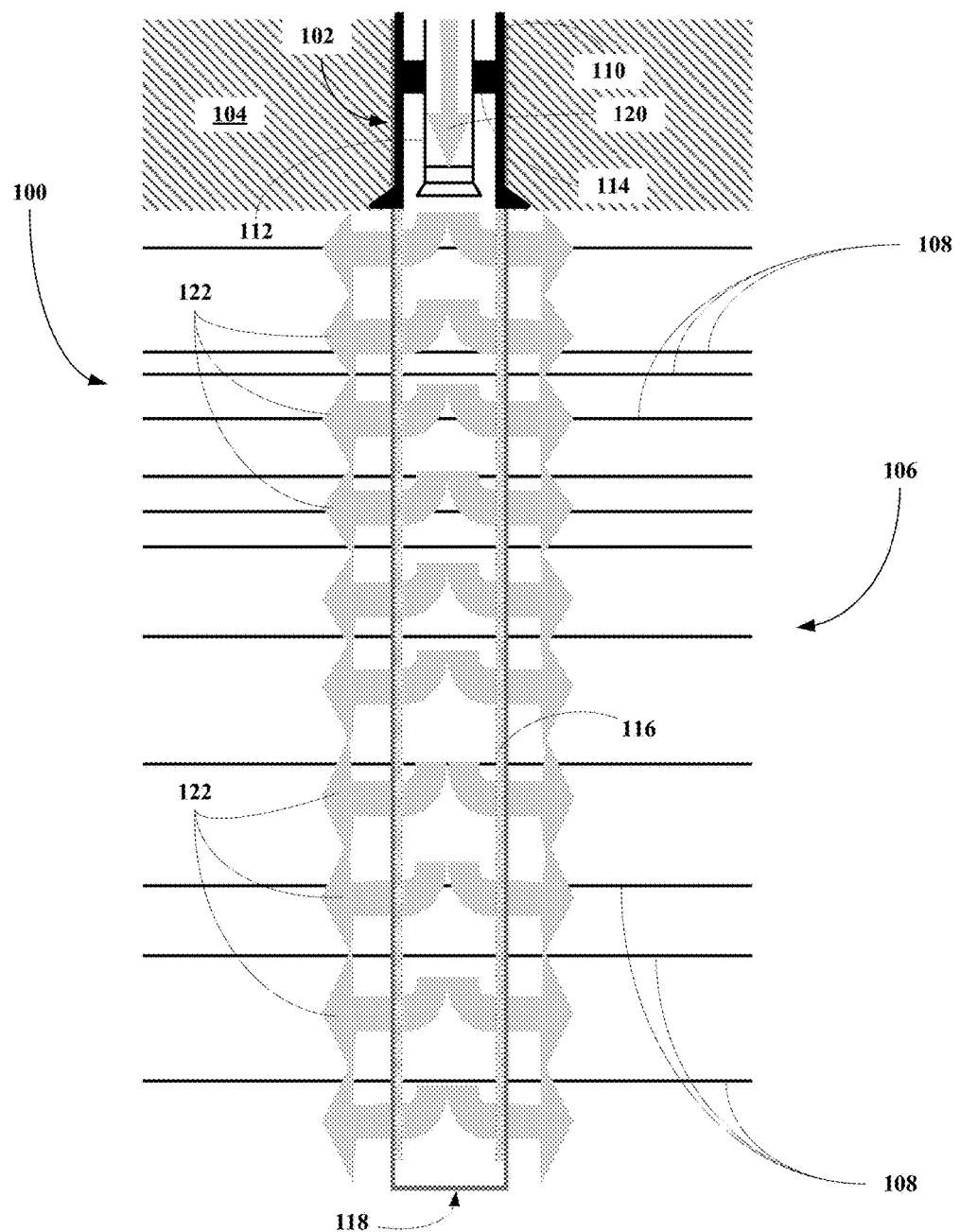
FIG. 1 depicts an embodiment of a vertically disposed well having a long producing interval including one diversion layer showing the diverted flow of treating material into the formation.

The term "self-degradable" or "self-degrading" filter cake or diversion layer means a cake or layer comprising: a) hydrolytically unstable materials such as PLA, PGA, or PLA/PGA, b) formation-fluid dissolving materials such as oil soluble resins, or c) slow-dissolving materials, i.e., materials that dissolve or degrade slowly over time under producing or injecting conditions including thermally unstable materials. The use of self-degradable layer materials removes the need for a separate fluid treatment to degrade or remove the filter cake as would be required for selectively erodible materials such as calcium carbonate or other metal carbonates.

DETAILED DESCRIPTION OF THE INVENTION

The inventors have found that new "self-degradable" filter cakes or filter layers may be constructed using self-degrading components, where the components are particulate and are either hydrolytically unstable particulate materials, formation-fluid dissolving particulate materials, or slow-dissolving particulate materials so that the filter cake(s) or layer(s) dissolves or degrade over time. In certain embodiments, the filter cake(s) or layer(s) may be designed to dissolve at a controlled rate or pre-determined rate. The present filter cakes or layers are degradable in the absence of a separate dissolution fluid treatment to degrade or erode the materials; however, a separate fluid may be injected to the well to enhance the degradation of the layers. The inventors have found that the present invention increases the interval length that can be treated with SandAid, a Weatherford treatment technology, or other matrix treatment from short intervals because of limitations in product placement into long sections with varying permeability. The inventors have also found that self-dissolving or self-degrading bridging compositions allow for temporary adjustment of the formation permeability to facilitate a more uniform injection of chemicals into long horizontal sections of wells with varying porosity profiles. For additional information concerning the SandAid product, the reader is referred to U.S. Pat. Nos. 7,392,847, 7,956,017, and 8,466,094 and United States Published Application Nos. 20100212905, 20110005756, and 20130075100, incorporated by reference via the closing paragraph.

We have successfully demonstrated the utility of the invention by treating a varying permeability formation model with a diversion layer and showing that the diversion layer drastically improved a uniformity or substantial uniformity of the permeability across the formations modeled in the apparatus. Using a controlled-permeability filter cake composed of sized calcium carbonate as an illustrative example, we were able to show that selecting a certain particle size distribution, the diversion layer will substantially equalize the penetration of the treating fluid across the formation eliminating or reducing "thief zone" or reducing the permeability of high permeability zones relative to lower permeability zones. The model is designed to illustrate the utility of the method in treated horizontal well having five zones with permeability ranging from 3 mDarcy to over 3 Darcy. Formation of controlled-permeability filter cake was demonstrated to equalize flow and permeability of all zones. Filter cake removal and compatibility with zeta potential or aggregation modifying agent have also been shown.

Previous studies described the formation of a controlled permeability filter cake using a filter cake or filter layer including solvent erodible components and non-erodible components, where the solvent erodible or dissolvable components erode or dissolve after exposure to a separate fluid treatment. In addition, the previous work focuses on carbonate particulate filter cakes or layers. On the contrary, the current invention relates to the creation of "self-degradable" filter cakes or layers that utilizes hydrolytically unstable, formation-fluid dissolving, or slow-dissolving materials to form the filter cake or layers or portions thereof, removing the need for a separate fluid treatment to degrade the filter cakes or layers. Removing a separate treating step has advantages, especially where the removal treatment may be incompatible with the sand control or other matrix treatment that is being delivered. In most cases, the removal of an extra pumping step of a different material will also simplify the operation and reduce cost and the possibility of error. Furthermore, degradation of the filter cake may lead to the re-establishment of uneven permeability patterns in the well, which may be preclude the cake removal fluid from properly contacting the entire length of the wellbore and leaving behind some filter cake material.

In certain embodiments, the hydrolytically unstable materials that degrade in the presence of water at increased temperatures include polylactic acid (PLA), polyglycolic acid (PGA), PLA/PGA copolymers, or mixtures and combinations thereof. These material erode or dissolve without the need for a separate fluid treatment. In other embodiments, the filter cakes or filter layers of this invention erosion or dissolution may be enhanced or accelerated through the addition of erosion or dissolution activating agents.

Formation-fluid dissolving materials may include oil soluble materials and/or water soluble materials. Oil-soluble materials include, without limitation, materials disclosed in U.S. Pat. No. 3,724,549. If these types of materials are used to form a filter cake or filter layer, oil production from the well will lead to filter cake or layer erosion or dissolution so that a clean-up treatment will be unnecessary. Examples of such material include oil-soluble resins (aliphatic and aromatic), waxes, benzoic acid, phthalic acid, and any other material with at least some solubility in oil. Other examples include ethylene-vinyl acetate copolymer, phenol-aldehyde resin, maleic resin, polyethylene, polyvinyl acetate, elastomers, plastics, or mixtures and combinations thereof. Water-soluble materials, on the other hand, should have low enough water solubility to not dissolve during treatment but enough water solubility to dissolve slowly over time with production of water from the well. Examples of this material are benzoic acid, phthalic acid, and inorganic salts such as certain anhydrous borates, carbonates, phosphates, rock salt, calcium/magnesium silicates, or mixtures and combinations thereof. As can be seen, some compounds can be classified as both oil and water soluble. Indeed, any compound with both a hydrophobic and hydrophilic component having partial water solubility and/or partial oil solubility may be used. Similarly, polymers including such structures may also be used.

Slow-dissolving materials, which may also overlap in some instances with formation-fluid dissolving materials, are materials that will dissolve slowly in the presence of water and/or oil introduced during the treatment or produced from the formation. They may have a higher overall solubility compared to previously described materials such that less fluid is required for their dissolution, but the rate of dissolution may be slowed by kinetic factors or other reasons. For instance, a polymer may have significant water solubility, but may be slow to dissolve due to a high level of crystallinity or other factors. Thermally unstable materials such as Diels Alder polymers (e.g., poly cyclopentadiene and furans) and azo-containing polymers can also be used. Such materials are initially insoluble but thermally decompose over time to monomers or oligomers with higher oil or water solubility such as cyclopentadiene. A specific material or mixture of materials with a particular dissolution rate under down-hole conditions may be chosen for a job based on a time period required for the filter cake or layer to remain stable. The material may be chosen such that the increase in permeability of the filter cake due to particle dissolution does not exceed the level required for adequate treatment fluid placement for the required period of time.

Because of this, it is crucial to engineer a filter cake that has low enough initial permeability to equalize effective permeability across the entire formation or any portion thereof, but not so low as to seal of the formation completely. The filter cake or layers of this invention will allow controllable flow through the filter cake or layers. The filter cake or layers of this invention also differentiates it from filter cake design for fluid-loss control during drilling operations, where the purpose is to seal off the wellbore during drilling to prevent fluid leak-off, although some of the materials used may be the same.

We have demonstrated the utility of the present filter cakes or layers using a model apparatus. In this apparatus, five sandstone cores having varying permeability ranging from about 10 mDarcy to about 3500 mDarcy, with the understanding that the invention may be used with formation having any permeability. The sandstone cores are drilled through the center for use in the apparatus and to verify the efficacy of the filter cake and layer and methods utilizing the filter cake and layers of this invention. The bored cores are fixed in clear plastic enclosures that allow flow through the center bore of the cores and out radially through sandstone cores. Brine is initially pumped through the untreated cores verifying uneven flow of the brine, where a majority of the fluid flow progressing through the high permeability cores. This situation is analogous to wells having high permeability "thief zones" stealing most of a well fluid treatment. Next, a filter composition is pumped through the system establishing a filter cake or a filter layer on the inside of the cores. Finally, brine is also pumped through the system, leading to approximately even flow through all of the cores. This demonstrates the effective permeability of the cores has been partially or substantially equalized, which is analogous to even treatment of the formation.

The inventors have also found that the diversion layer may be used with coil tubing (CT) or jointed pipe. The inventors have found that a filter cake may be formed across the whole interval, but without any breaker or removing agent. The inventors have found that the methods may also include selectively, treating each interval, where annular cross flow may be prevented by placing pressure in the CT/OH (or casing or even screen) annulus, while treating down the CT. In this embodiment, we would first pump a weak acid to break the polymer and then use the permeable filter cake to do the diversion. This method, has no theoretical limits to it length, other than how far CT may be extended into the well, especially a horizontal well with long intervals.

LAYER PROPERTIES OF THIS INVENTION

The layer forming compositions may include between 0.1 vol. % to 60 vol. % of particulate solids suspended in a base fluid. In certain embodiments, the layer forming compositions include between 1 vol. % to 50 vol. % of particulate solids suspended in a base fluid. In certain embodiments, the layer forming compositions include between 1 vol. % to 40 vol. % of particulate solids suspended in a base fluid. In certain embodiments, the layer forming compositions include between 1 vol. % to 30 vol. % of particulate solids suspended in a base fluid. In certain embodiments, the layer forming compositions include between 1 vol. % to 20 vol. % of particulate solids suspended in a base fluid. In certain embodiments, the layer forming compositions include between 1 vol. % to 10 vol. % of particulate solids suspended in a base fluid. In certain embodiments, the layer forming compositions include between 1 vol. % to 5 vol. % of particulate solids suspended in a base fluid. Suitable base fluid include water, viscosified water, aqueous solutions, well treating fluids, or other similar fluids used in downhole operations.

The thickness of the diversion layer or layers range from about 0.01 mm to about 30 mm. In certain embodiments, the diversion layer or layers thickness range from about 0.1 mm to about 10 mm. In other embodiments, the diversion layer or layers thickness range from about 0.2 mm to about 2 mm. In certain embodiments, the diversion layer or layers thickness range from about 0.2 mm to about 1 mm. In certain embodiments, larger thickness may be needed to fill any cracks or natural fractures in the formation, on top of which smaller particle diversion layer can form.

The particle size distributions of the diversion layer forming materials are between 0.1 μm and 800 μm. In certain embodiments, the particle size distributions of the diversion layer forming materials are between 0.5 μm and 500 μm. In other embodiments, the particle size distributions of the diversion layer forming materials are between 0.1 μm and 200 μm. In other embodiments, the particle size distributions of the diversion layer forming materials are between 0.1 μm and 100 μm. In other embodiments, the particle size distributions of the diversion layer forming materials include materials having different particle size distribution. In certain embodiments, the layer materials include materials having a particles size distribution between 0.1 μm and 50 μm, materials having a particle size distribution between 0.1 μm and 500 μm. In certain embodiments, the layer materials include materials having a particles size distribution between 0.1 μm and 500 μm, but having overlapping distributions having peak distribution values of about 5 μm, 10 μm, 20 μm, 40 μm, 50 μm, 60 μm, 70 μm, 80 μm, 90 μm and 100μ. The term peak distribution means the particles size making the largest contribution to the distribution. In other embodiments, the particle size distribution of the material is initially high, between 1 mm and 3 mm, to fill in any cracks or natural fractures in the formation, and then successively lower particle sizes are pumped to form the diversion layer.

The layer or layers have a permeability between about 1 mD and about 100 mD. In certain embodiments, the permeability is between about 1 mD and about 90 mD. In other embodiments, the permeability is between about 1 mD and about 80 mD. In other embodiments, the permeability is between about 1 mD and about 70 mD. In other embodiments, the permeability is between about 1 mD and about 60 mD. In other embodiments, the permeability is between about 1 mD and about 50 mD. The layers once deposed or placed on the surfaces of formation, interval, intervals or zones thereof, the layers equalize the permeability of the zone reducing or eliminating "thief zones". Thus, the layers equalize the permeability of zones having permeability ranging from 100 mD to 3000 mD so that well treating fluids will flow more evenly into all zone without being directed only to the high permeability zones. In this manner, the diversion layers permit well treatments to have improved zone coverage, uniformity and completeness.

SUITABLE REAGENTS FOR USE IN THE INVENTION

Suitable components for filter cake formation include, without limitation, any polymer that degrades hydrolytically (i.e., degrades when exposed to water or an aqueous solution or a fluid including an aqueous phase), formation-fluid dissolving materials such as oil soluble resins, and slow-dissolving materials, i.e., materials that dissolve or degrade slowly over time under producing or injecting conditions including thermally unstable materials or mixtures and combinations thereof. In certain embodiments, the polymers release an acid during degradation such as polylactic acid releasing lactic acid as it degrade. These released acids, when combined with a carbonate particulate such as calcium carbonate, will facilitate the decomposition of the carbonate to carbon dioxide and ions such as calcium ions creating a self-degrading filter cake. Other materials which can be used besides poly lactic acid (PLA) and poly glycolic acid (PGA). Specific examples of suitable polymers include polysaccharides such as dextran or cellulose; chitin; chitosan; proteins; aliphatic polyesters; poly(lactides); poly(glycolides); poly(ε-caprolactones); poly(hydroxybutyrates); aliphatic polycarbonates; poly(orthoesters); poly(amides); poly(urethanes); poly(hydroxy ester ethers); poly(anhydrides); aliphatic polycarbonates; poly(orthoesters); poly(amino acids); poly(ethylene oxide); and polyphosphazenes.

Non-limiting examples of suitable degradable polymers, include polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid), poly(amino acids), poly(methyl vinyl ether), poly(maleic anhydride), chitin, chitosan, and copolymers, terpolymers, or higher poly-monomer polymers thereof or combinations or mixtures thereof. The preferred biodegradable polymers are all degraded by hydrolysis. Additional information may be found in U.S. Pat. No. 8,434,559 B2.

Typically, the polymers will either be surface erodible polymers such as polyanhydrides or bulk erodible polymers such as polyorthoesters. Poly(l-lactic acid) (PILA), poly(dl-lactic acid) (PLA), poly(glycolic acid) (PGA), polycaprolactones, copolymers, terpolymer, higher poly-monomer polymers thereof, or combinations or mixtures thereof are preferred biocompatible, biodegradable polymers. The preferred biodegradable copolymers are lactic acid and glycolic acid copolymers sometimes referred to as poly(dl-lactic-co-glycolic acid) (PLG). The co-monomer (lactide:glycolide) ratios of the poly(DL-lactic-co-glycolic acid) are preferably between about 100:0 to about 50:50 lactic acid to glycolic acid. Most preferably, the co-monomer ratios are between about 85:15 and about 50:50 lactic acid to glycolic acid. Blends of PLA with PLG, preferably about 85:15 to about 50:50 PLG to PLA, are also used to prepare polymer materials.

PLA, PILA, PGA, PLG and combinations or mixtures or blends thereof are among the synthetic polymers approved for human clinical use. They are presently utilized as surgical suture materials and in controlled release devices, as well as in other medical and pharmaceutical applications. They are biocompatible and their degradation products are low molecular weight compounds, such as lactic acid and glycolic acid, which enter into normal metabolic pathways. Furthermore, copolymers of poly(lactic-co-glycolic acid) offer the advantage of a large spectrum of degradation rates from a few days to years by simply varying the copolymer ratio of lactic acid to glycolic acid.

Other suitable degradable barriers include hydrolytically degradable materials, such as hydrolytically degradable monomers, oligomers and polymers, and/or mixtures of these. Other suitable hydrolytically degradable materials include insoluble esters that are not polymerizable. Such esters include formates, acetates, benzoate esters, phthalate esters, and the like. Blends of any of these also may be suitable. Blends with hydrolytically unstable polymers can also be used to increase the rate of acid generation and polymer hydrolysis.

For instance, polymer/polymer blends or monomer/polymer blends may be suitable. Such blends may be useful to affect the intrinsic degradation rate of the hydrolytically degradable material. These suitable hydrolytically degradable materials also may be blended with suitable fillers (e.g., particulate or fibrous fillers to increase modulus), if desired.

In choosing the appropriate hydrolytically degradable material, one should consider the degradation products that will result. Also, these degradation products should not adversely affect other operations or components.

The choice of hydrolytically degradable material also can depend, at least in part, on the conditions of the well, e.g., well bore temperature. For instance, lactides may be suitable for use in lower temperature wells, including those within the range of 15° C. to 65° C., and polylactides may be suitable for use in well bore temperatures above this range.

The degradability of a polymer depends at least in part on its backbone structure. The rates at which such polymers degrade are dependent on the type of repetitive unit, composition, sequence, length, molecular geometry, molecular weight, morphology (e.g., crystallinity, size of spherulites and orientation), hydrophilicity, hydrophobicity, surface area and additives. Also, the environment to which the polymer is subjected may affect how it degrades, e.g., temperature, amount of water, oxygen, microorganisms, enzymes, pH and the like.

Some suitable hydrolytically degradable monomers include lactide, lactones, glycolides, anhydrides and lactams.

Some suitable examples of hydrolytically degradable polymers that may be used include, but are not limited to, those described in the publication of Advances in Polymer Science, Vol. 157 entitled "Degradable Aliphatic Polyesters" edited by A. C. Albertsson. Specific examples include homopolymers, random, block, graft, and star- and hyperbranched aliphatic polyesters.

Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; aliphatic polyesters; poly(lactides); poly(glycolides); poly(.epsilon.-caprolactones); poly(hydroxybutyrates); aliphatic polycarbonates; poly(orthoesters); poly(amides); poly(urethanes); poly(hydroxy ester ethers); poly(anhydrides); aliphatic polycarbonates; poly(orthoesters); poly(amino acids); poly(ethylene oxide); and polyphosphazenes.

Of these suitable polymers, aliphatic polyesters and polyanhydrides may be preferred. Of the suitable aliphatic polyesters, poly(lactide) and poly(glycolide), or copolymers of lactide and glycolide, may be preferred.

The lactide monomer exists generally in three different forms: two stereoisomers l- and d-lactide and racemic d,l-lactide (meso-lactide). The chirality of lactide units provides a means to adjust, among other things, degradation rates, as well as physical and mechanical properties.

Poly(l-lactide), for instance, is a semi-crystalline polymer with a relatively slow hydrolysis rate. This could be desirable in applications where a slower degradation of the hydrolytically degradable material is desired.

Poly(d,l-lactide) may be a more amorphous polymer with a resultant faster hydrolysis rate. This may be suitable for other applications where a more rapid degradation may be appropriate.

The stereoisomers of lactic acid may be used individually or combined. Additionally, they may be copolymerized with, for example, glycolide or other monomers like 8-caprolactones, 1,5-dioxepan-2-one, trimethylene carbonate, or other suitable monomers to obtain polymers with different properties or degradation times. Additionally, the lactic acid stereoisomers can be modified by blending high and low molecular weight poly(lactide) or by blending poly(lactide) with other polyesters.

Plasticizers may be present in the hydrolytically degradable materials, if desired. Suitable plasticizers include, but are not limited to, derivatives of oligomeric lactic acid, polyethylene glycol; polyethylene oxide; oligomeric lactic acid; citrate esters (such as tributyl citrate oligomers, triethyl citrate, acetyltributyl citrate, acetyltriethyl citrate); glucose monoesters; partially fatty acid esters; PEG monolaurate; triacetin; poly(.epsilon.-caprolactones); poly(hydroxybutyrate); glycerin-1-benzoate-2,3-dilaurate; glycerin-2-benzoate-1,3-dilaurate; starch; bis(butyl diethylene glycol)adipate; ethylphthalylethyl glycolate; glycerine diacetate monocaprylate; diacetyl monoacyl glycerol; polypropylene glycol (and epoxy, derivatives thereof); poly(propylene glycol)dibenzoate, dipropylene glycol dibenzoate; glycerol;

ethyl phthalyl ethyl glycolate; poly(ethylene adipate)distearate; di-iso-butyl adipate; and combinations thereof.

The physical properties of hydrolytically degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, among other things, elongational viscosity with tension-stiffening behavior.

The properties of the material utilized can be further tailored by blending, and copolymerizing it with another polymer, or by a change in the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains.

For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Polyanhydrides are another type of particularly suitable degradable polymer. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

Degradation Enhancing Agents

To enhance degradation of the polymers, the compositions of the present invention can also include the addition of enzymes that may facilitate the degradation of the polymers used in the composition. In certain embodiments, the enzymes or similar reagents are proteases or hydrolases with ester-hydrolyzing capabilities. Such enzymes include, without limitation, proteinase K, bromelaine, pronase E, cellulase, dextranase, elastase, plasmin streptokinase, trypsin, chymotrypsin, papain, chymopapain, collagenase, subtilisn, chlostridopeptidase A, ficin, carboxypeptidase A, pectinase, pectinesterase, an oxidoreductase, an oxidase or mixtures and combinations thereof. Formation-fluid dissolving materials may include oil soluble materials and/or water soluble materials. Oil-soluble materials include, without limitation, materials disclosed in U.S. Pat. No. 3,724,549. If these types of materials are used to form a filter cake or filter layer, oil production from the well will lead to filter cake or layer erosion or dissolution so that a clean-up treatment will be unnecessary. Examples of such material include oil-soluble resins (aliphatic and aromatic), waxes, benzoic acid, phthalic acid, and any other material with at least some solubility in oil. Other examples include ethylene-vinyl acetate copolymer, phenol-aldehyde resin, maleic resin, polyethylene, polyvinyl acetate, elastomers, plastics, or mixtures and combinations thereof. Water-soluble materials, on the other hand, should have low enough water solubility to not dissolve during treatment but enough water solubility to dissolve slowly over time with production of water from the well. Examples of this material are benzoic acid, phthalic acid, and inorganic salts such as certain borate, carbonate, phosphate or other salts. As can be seen, some compounds can be classified as both oil and water soluble. Indeed, any compound with both a hydrophobic and hydrophilic component having partial water solubility and/or partial oil solubility may be used. Similarly, polymers including such structures may also be used.

Hydrocarbon Soluble Polymers

Suitable hydrocarbon soluble polymers include, without limitation, linear polymers, block polymers, graft polymers, star polymers or other multi-armed polymers, which include one or more olefin monomers and/or one or more diene monomers and mixtures or combinations thereof. The term polymer as used herein refers to homo-polymers, co-polymers, polymers including three of more monomers (olefin monomers and/or diene monomers), polymer including oligomeric or polymeric grafts, which can comprise the same or different monomer composition, arms extending form a polymeric center or starring reagent such as tri and tetra valent linking agents or divinylbenzene nodes or the like, and homo-polymers having differing tacticities or microstructures. Exemplary examples are styrene-isoprene copolymers (random or block), triblocked, multi-blocked, styrene-butadiene copolymer (random or block), ethylene-propylene copolymer (random or block), sulphonated polystyrene polymers, alkyl methacrylate polymers, vinyl pyrrolidone polymers, vinyl pyridine, vinyl acetate, or mixtures or combinations thereof.

Suitable olefin monomer include, without limitation, any monounsaturated compound capable of being polymerized into a polymer or mixtures or combinations thereof. Exemplary examples include ethylene, propylene, butylene, and other alpha olefins having between about 5 and about 20 carbon atoms and sufficient hydrogens to satisfy the valency requirement, where one or more carbon atoms can be replaced by B, N, O, P, S, Ge or the like and one or more of the hydrogen atoms can be replaced by F, Cl, Br, I, OR, SR, COOR, CHO, C(O)R, C(O)NH2, C(O)NHR, C(O)NRR', or other similar monovalent groups, polymerizable internal mono-olefinic monomers or mixtures or combinations thereof, where R and R' are the same or different and are carbyl group having between about 1 to about 16 carbon atoms and where one or more of the carbon atoms and hydrogen atoms can be replaced as set forth immediately above.

Suitable diene monomer include, without limitation, any doubly unsaturated compound capable of being polymerized into a polymer or mixtures or combinations thereof. Exemplary examples include 1,3-butadiene, isoprene, 2,3-dimethyl butadiene, or other polymerizable diene monomers.

Non-Self Degrading Filter Cake Materials

The self-degrading components are designed to erode or dissolve in contact with production fluids as the production fluids generally production fluids include an aqueous phase, which is sufficient to erode or dissolve the self-degrading components. Moreover, for layers that include self-degrading components as well as removable components, the production fluids will degrade the self-degrading components generating acids that dissolve the removable components. Exemplary examples for removable components include, without limitation, (1) alkaline metal carbonates such as magnesium carbonate ($MgCO_3$), calcium carbonate ($CaCO_3$), strontium carbonate ($SrCO_3$), and/or barium carbonate ($BaCO_3$), (2) asphalts such as gilsonite, bitumen, and/or asphaltum, (3) mixtures or combinations thereof. In other embodiments, the layer may be exposed to a solution including agents to enhance the degradation of self-degrading components. In other embodiment, the layer may include 0.1 wt. % to 2 wt. % of the agents to enhance the degradation of self-degrading components so that the layer degrade faster or at an accelerated rate.

Well Treatments

Suitable well treatments include, without limitation, any well treatment that may be diverted through the diversions layers of this invention. Exemplary treatments include sand control treatments, aggregating treatments, and zeta modifying treatments such as SandAid/zeta potential, sticky/tacky materials such as SandWedge, sand consolidation/formation consolidation treatments, where monomers are pumped through filter cake and then polymerize in situ to consolidate the formation such as thermal epoxy, furan, phenolic resins, etc., scale inhibitor treatments, paraffin inhibitor treatments, wettability modifier treatments, biocide treatments, gel breaker treatments, enzyme treatments, defoamer treatments, acid treatments, and mixtures or combinations thereof. For injection wells, the filter cake will allow even surfactant and polymer flooding treatments to be pumped through the filter cake into the formation which also experiences the same uneven permeability issues.

FILTER CAKE OR FILTER LAYER FORMATION AND ARRANGEMENTS

Referring now to FIG. 1, an embodiment of a diversion system for diverting a treating fluid into a producing interval of a vertically oriented well, generally 100, is shown to include a bore hole 102 in the earth through a non-producing formation 104 into a producing interval 106 having different geological strata 108. The system 100 includes casing 110, a working string or production tubing 112 and a packer 114 to isolate the interval 106 from the non-producing formation 104. The system 100 also includes a controlled permeability layer 116 formed on a surface 118 of the interval 106. The diversion layer 116 has controlled permeability due to the particle size distribution, particles shapes, and/or particle densities of the material comprising the layer 116 or produced in the layer 116 due to the erosion of the particles in the layer 116 over time. As a treating fluid 120 such as a sand control fluid is pumped into the working string or production string 112, the fluid 120 passes through the layer 116 and is diverted or spread out forming diversion jets 122 improving treating coverage, completeness, and/or uniformity across the formation. Thus, the layer 116 evens out the effective permeability of segments of the formation so that the permeability of the entire formation surface is the same or substantially the same, where the term substantially means that the permeability from point to point along the formation differs by no more than 500%. In certain embodiments, the permeability differs by no more the 50%. In other embodiments, the permeability differs by no more than 25%. In other embodiments, the permeability differs by no more than 10%. The layer 116 is composed of materials that degrades over time so that after a period time after the treatment, the layer 116 will degrade returning the formation to its original state. In certain embodiments, the layer 116 may be treated with a fluid that will accelerate the degradation without adversely affecting the formation.

Figure 2:
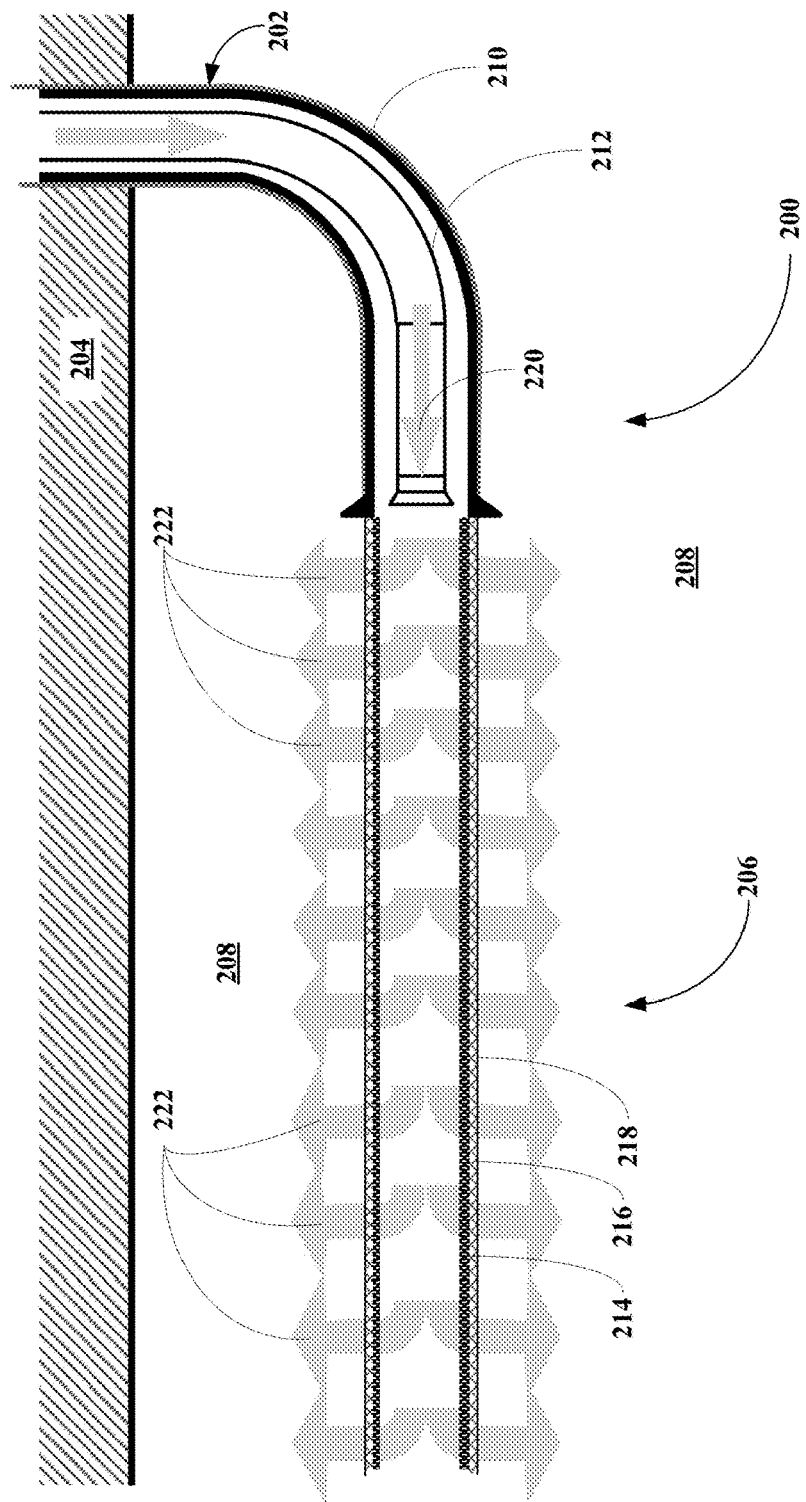
FIG. 2 depicts an embodiment of a horizontally disposed well having a long producing interval including one diversion layer showing the diverted flow of treating material into the formation.

Referring now to FIG. 2, an embodiment of a diversion system for diverting a treating fluid into a well having an extended producing horizontal interval, generally 200, is shown to include a bore hole 202 in the earth through a non-producing formation 204 into an extended producing interval 206 of a geological stratum 208. The system 200 includes casing 210, a working string or production tubing 212. The system 200 also includes a diversion layer 214 formed on a screen 216 disposed adjacent a surface 218 of the interval 206. The diversion layer 214 has controlled permeability as set forth above. As a treating fluid 220 such as a sand and/or water control fluid is pumped into the working string 212, it passes through the layer 214 and the screen 216 and is diverted or spread out into the interval 206 forming uniform diversion jets 222 across the formation improving treating coverage, completeness and/or uniformity.

Diverted Formations

Figure 3A:
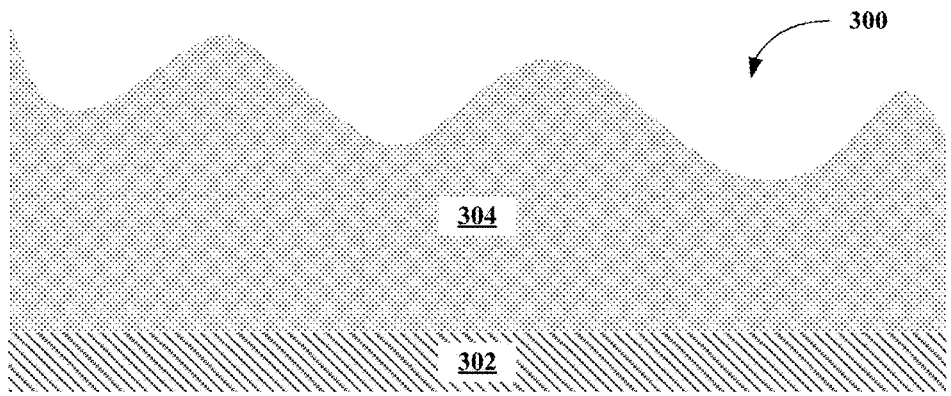
FIGS. 3A-C depict embodiments of diverted formations.

Referring now to FIG. 3A, an embodiment of a diverted formation of the present invention, generally 300, is shown to include a producing formation 302. The producing formation 302 has formed or deposited thereon a diversion layer 304. The diversion layer 304 is shown here to be of non-uniform thickness across the portion of the producing formation 302 shown and having a first porosity.

Figure 3B:
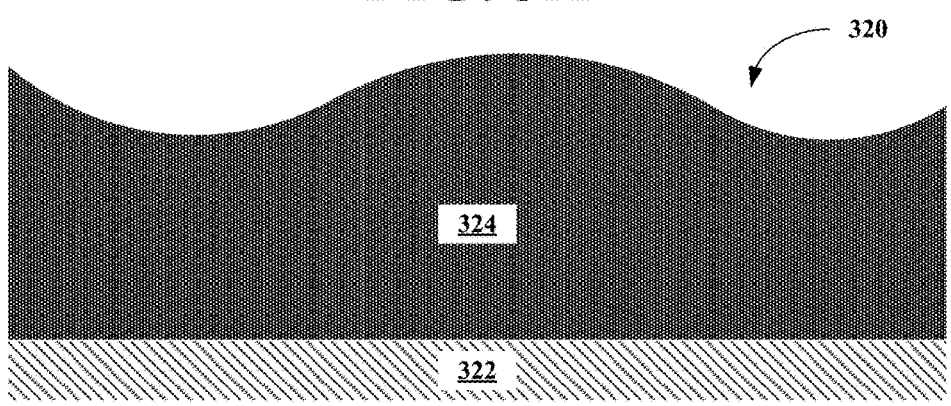

Referring now to FIG. 3B, another embodiment of an embodiment of a diverted formation of the present invention, generally 320, is shown to include a producing formation 322. The producing formation 322 has formed or deposited thereon a diversion layer 324. The diversion layer 324 is shown here to be of more uniform thickness across the portion of the producing formation 322 shown, but having a waved surface uniform variations in layer thickness and having a second porosity.

Figure 3C:
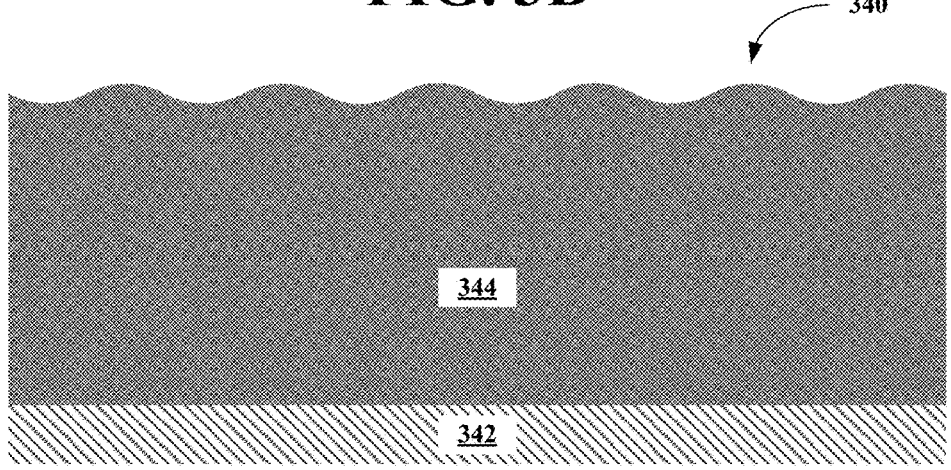

Referring now to FIG. 3C, another embodiment of a diverted formation of the present invention, generally 340, is shown to include a producing formation 342. The producing formation 342 has formed or deposited thereon a diversion layer 344. The diversion layer 344 is shown here to be of a more uniform thickness across the portion of the producing formation 342 shown, but having a consistent waved surface with smaller waves smaller uniform variations in the layer thickness and having a third porosity.

The three porosities are defined by the particles size distribution, shape and density of the layer material or filter cake material. By a judicious choice of the filter cake material, the permeability of the layer may be varied from very low permeability to higher permeability. Additionally, as the filter cake ages (length of time the filter cake remains in place), the porosity of the layer increases as the material in the layer degrades hydrolytically or otherwise as stated herein. Again, in certain embodiments, the rate of hydrolysis may be increased by exposing the layer to a fluid including agents to accelerate decomposition such as solvents in the case of hydrocarbon soluble resins, enzymes in the case of polyacids such as polylactic acid, or acids in the case of particulate carbonate layers.

Referring now to FIG. 4A, another embodiment of a diverted formation of the present invention, generally 400, is shown to include a producing formation 402. The diverted formation 400 includes a screen assembly 404 disposed on the formation 402. The diverted formation 400 also includes a diversion layer 406 formed on the screen assembly 404, where the diversion layer 406 comprises particles having a larger diameter than the openings of the screen assembly 404.

Referring now to FIG. 4B, another embodiment of a diverted formation of the present invention, generally 450, is shown to include a producing formation 452. The diverted formation 450 includes a screen assembly 454 disposed on the formation 452. The diverted formation 450 also includes a diversion layer 456 disposed between the screen assembly 454 and the formation 452. In this case, the diversion layer 456 comprises particles having a smaller diameter than the openings of the screen assembly 454. The layer 456 is formed by depositing a diversion composition 458 on the screen assembly 454. The composition 458 then flows through the screen assembly 458 to form the layer 456.

Figure 5:
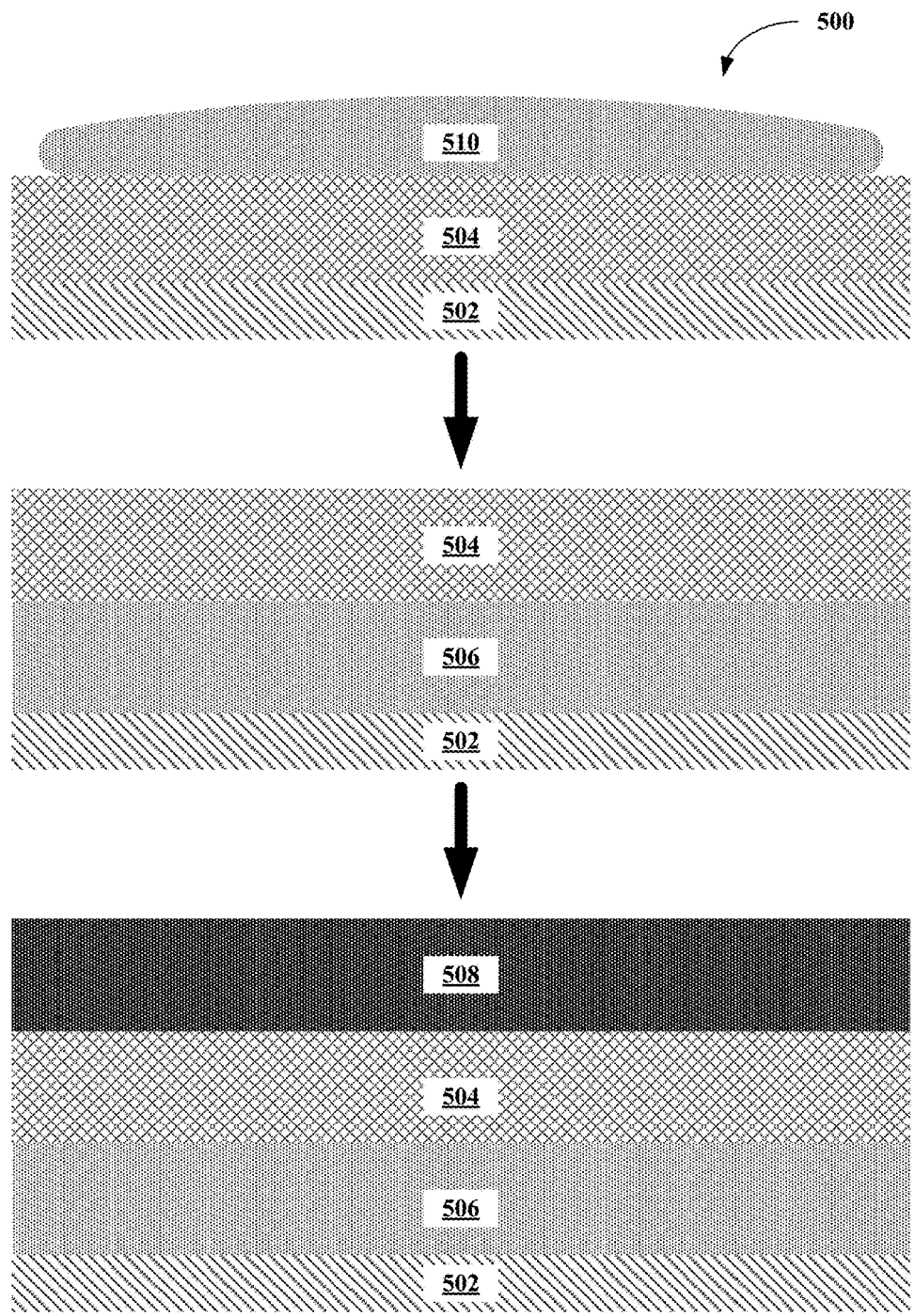
FIG. 5 depicts another embodiment of diverted formations and methods for preparing the diverted formation.

Referring now to FIG. 5, another embodiment of a diverted formation of the present invention, generally 500, is shown to include a producing formation 502. The diverted formation 500 includes a screen assembly 504 disposed on the formation 502. The diverted formation 500 also includes a first diversion layer 506 interposed between the formation 502 and the screen assembly 504, and a second diversion layer 508 formed on the screen assembly 504, where the first diversion layer 506 comprises particles having a smaller larger diameter than the openings of the screen assembly 504 and the second diversion layer 508 comprises particles having a larger diameter than the openings of the screen assembly 504. The first diversion layer 506 is formed by depositing a first diversion composition 510 on the surface of the screen assembly 504, which then flows through the screen assembly 504 to form the first diversion layer 506, while the second layer 508 is simple deposed on the screen assembly 504.

Referring now to FIG. 6, another embodiment of a diverted formation of the present invention, generally 600, is shown to include a producing formation 602. The diverted formation 500 includes a diversion layer 604 formed on the formation 602. Once formed on the formation 602, the diversion layer 604 is allowed to age in the presence of an aqueous solution 606 causing the layer 604 to degrade changing the porosity of the layer 608.

Prior Art Treatments without a Diversion Layer

Referring now to FIG. 7, an illustration of a prior art treatment of a producing formation without a diversion layer, generally 700, is shown to include a producing formation 702. A treating composition 704 is then applied to the formation 702. Because the formation does not include a diversion layer, the treating composition 704 penetrates the formation 702 in channels solution 706, while the channels 706 are exaggerated; the figure is designed to illustrate the non-uniformity of the treatment.

Present Treatments with a Diversion Layer

Figure 8:
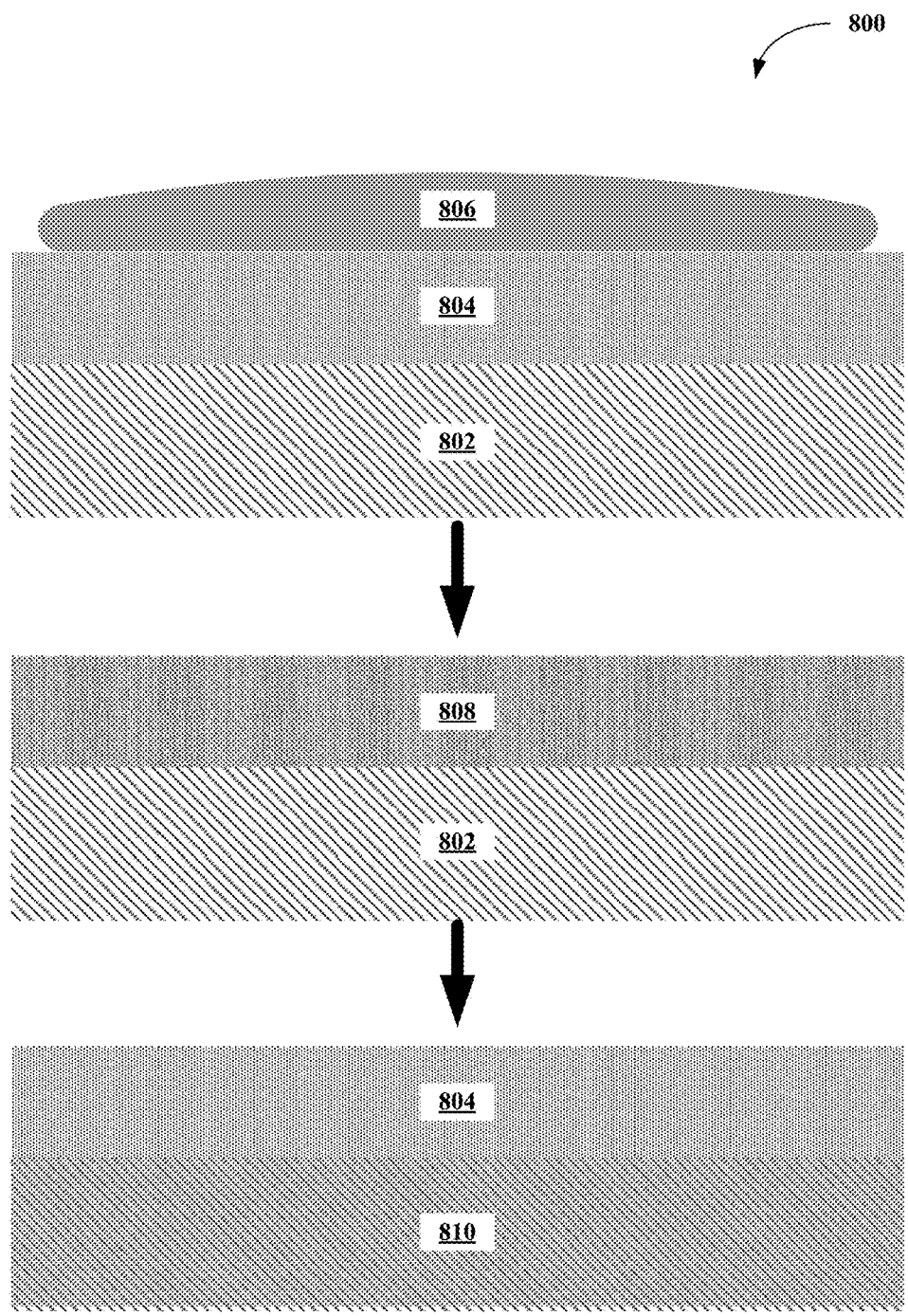
FIG. 8 illustrates a treatment of a formation including a diversion layer deposited on the formation prior to treatment.
Figure 8:
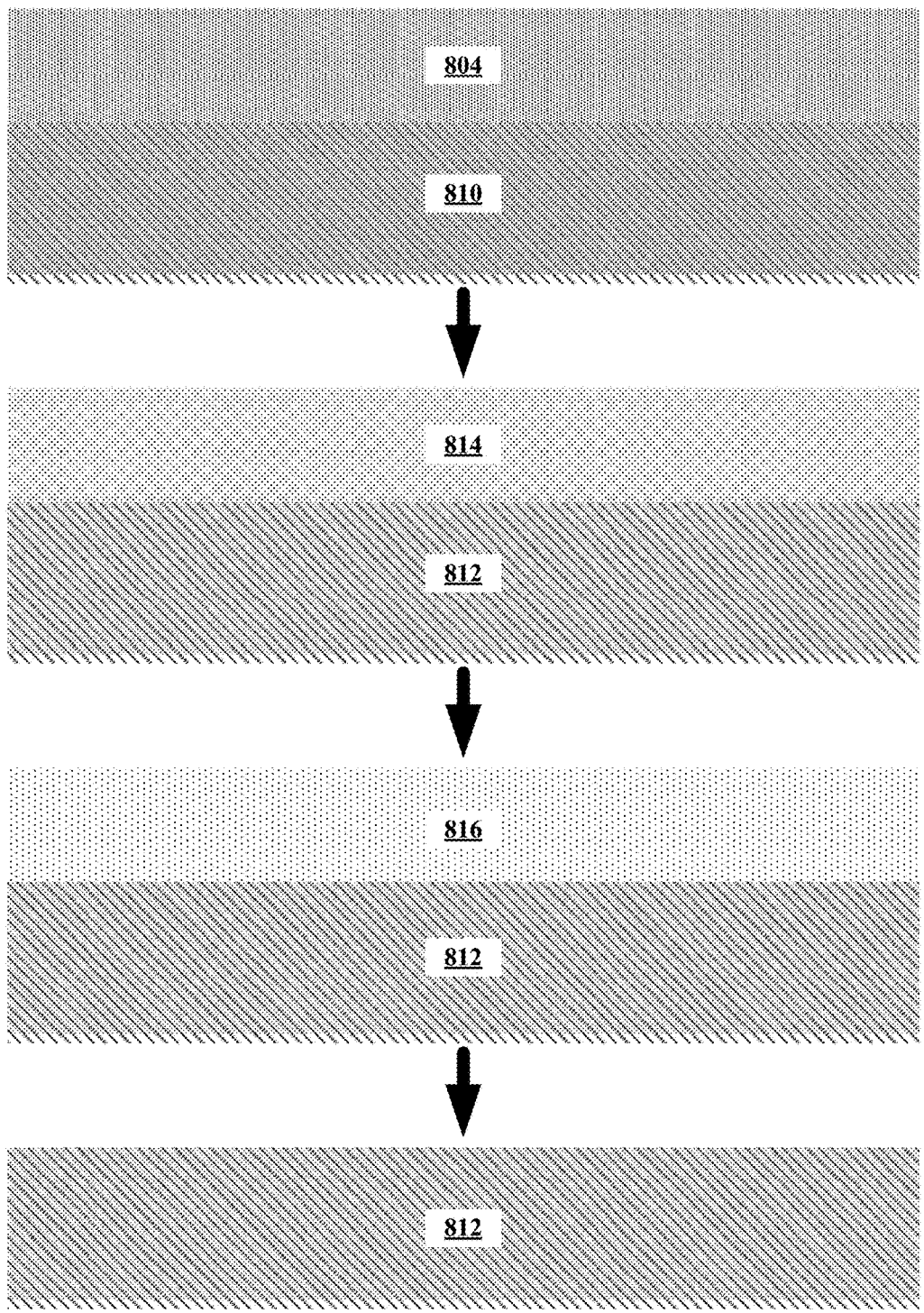

Referring now to FIG. 8, an illustration of a treatment of a producing formation having a diversion layer of this invention, generally 800, is shown to include a producing formation 802 having a diversion layer 804 formed on the formation 802. A treating composition 806 is then applied to the diversion layer 804 of the formation 802. The treating composition 806 is diverted through the diversion layer 804 to form a diverted treatment layer 808. Because the formation 802 includes the diversion layer 804, the treating composition 806 enters the formation 802 from the diverted treatment layer 808 in a more uniform manner to form a uniformly or substantially uniformly treated formation 810. Once the treating composition 806 has penetrated the formation 802 to the extent desired, flow back of the treating solution 806 leaves a treated formation 812, where the treatment may be temporary, substantially permanent or permanent. Once treatment flow back has occurred, the flow back and production from the formation 802 and self-degradation will begin to erode the diversion layer 804 forming partially eroded layer 814, further eroded layer 816, and finally the removal of the layer 804.

EXPERIMENTS OF THE INVENTION

Introduction

Figure 9:
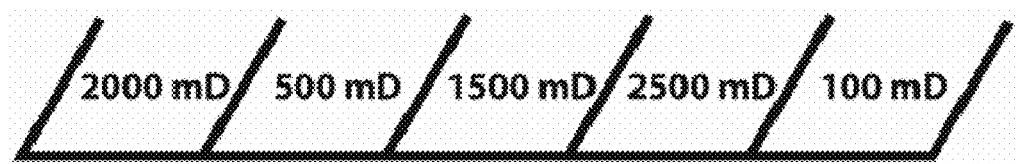
FIG. 9 depicts a representation of a well with zones of largely varying permeability.

Sand production from oil and/or gas wells may lead to damage or plugging of screens, tubulars, and surface equipment and may necessitate costly maintenance or work over operations. Various mechanical and chemical treatments are available to mitigate this problem including zeta potential or aggregation modifying agent products such as SandAid available from Weatherford. Remedial pumping of zeta potential or aggregation modifying agents into a formation or formation zone may decrease sand production and increase the maximum sand free rate at which a well may produce. Great success has been achieved in the matrix treatment of short intervals with sand control, scale inhibitor, paraffin inhibitor, acidizing and other treatments. However, proper placement of such treatments becomes much more difficult in long horizontal wells for two main reasons. First, too large of a pressure drop along the well will lead to insufficient treatment towards the end of the wellbore. Second, such wells typically have a high variability in permeability along the formation. FIG. 9 shows a representation of varying permeability across an interval, which is common with long horizontal wells. In such cases, a majority of any treatment fluid leaks off into high permeability zones and not enough enter lower permeability zones. This situation is generally exacerbated if a high permeability region (thief zone) is located towards the heel of the well, leading to even more leak-off at the beginning of the well, or if there are any natural fractures in the formation.

In order to properly treat a well with this configuration, it is necessary to divert some treatment fluid away from high permeability zones or segments to lower permeability zones or segments. The methods of this invention provide treatments for long horizontal wells by depositing or building up a controlled-permeability filter cake on an inside of the wellbore and then pumping the treatment through the filter cake. If the filter cake permeability is engineered correctly, then the effective permeability across the formation should be substantially even, leading to the even treatment to each zone. The term substantially here means that the permeability across the formation differs by no more that 500%. In certain embodiments, the permeability across the formation differs by no more than 250%. In certain embodiments, the permeability across the formation differs by no more than 100%. In certain embodiments, the permeability across the formation differs by no more than 50%. In certain embodiments, the permeability across the formation differs by no more than 25%. In other embodiments, the permeability across the formation differs by no more than 10%. In other embodiments, the permeability across the formation differs by no more than 5%.

Results and Discussions

Test Filter Cake Formation and Permeability

Figure 10A:
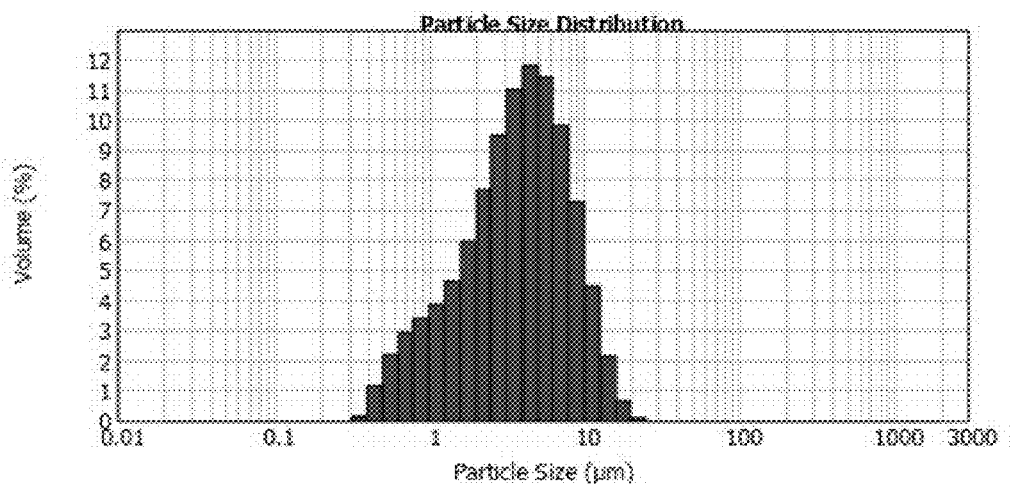
FIGS. 10A-C depicts a particle size distributions for A) Wel-Carb 2 ($D_{50}$=3.8 µm), B) Wel-Carb 25 ($D_{50}$=21.5 µm), and C) Wel-Carb 50 ($D_{50}$=39.6 µm).
Figure 10B:
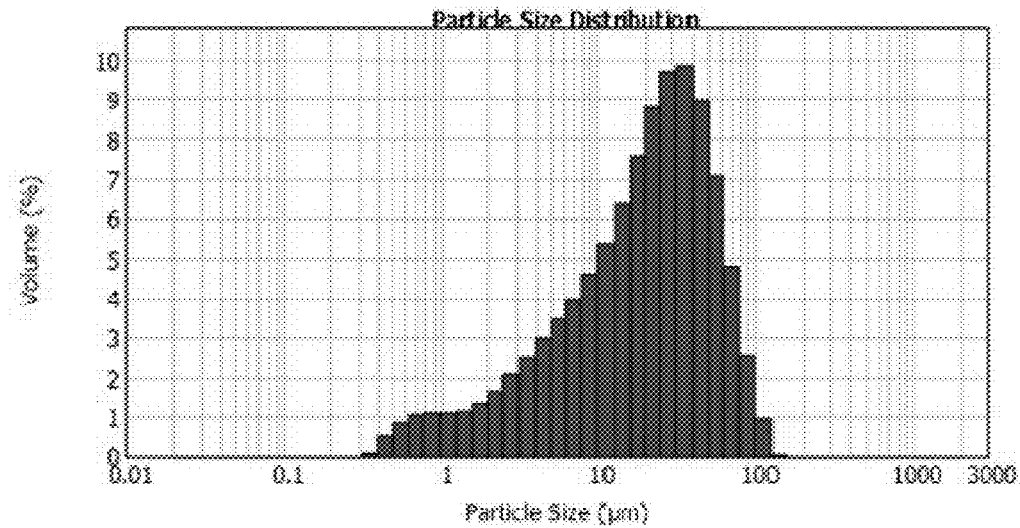
Figure 10C:
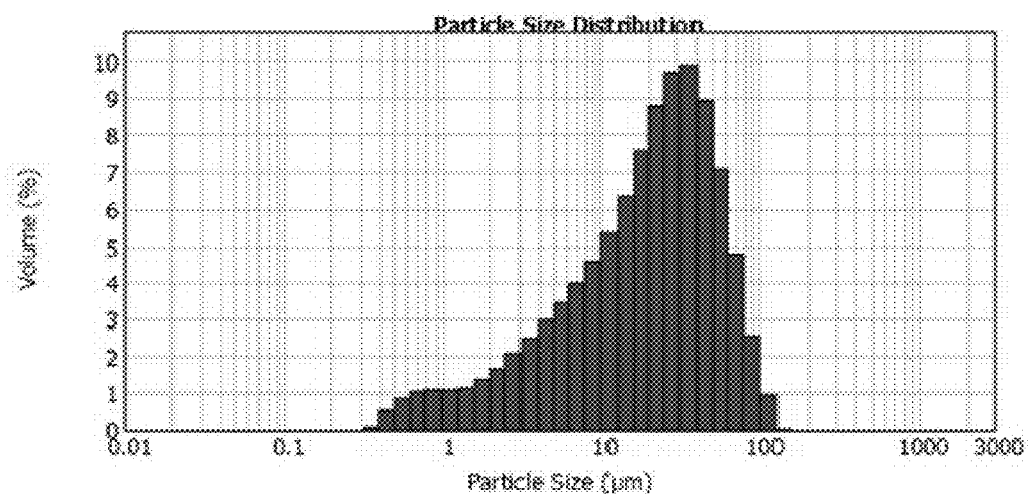

The permeability and particle size requirements for the filter cakes or layers were tested experimentally. Assuming a lowest permeability zone of 100 mD, the filter cake should have a permeability at least this low. However, initial modeling suggested that a filter cake permeability of about 1 mD to about 50 mD may be adequate. We approximated material particle size distributions to achieve a 50 mD filter cake using the Rumpf-Gupte approximation for packed spheres, which gave a particle size of about 9 µm. However, samples of real filter cake materials always have a particle size distribution, which will affect filter cake permeability. Actual particle size distributions for several batches of sized calcium carbonate used for drilling fluids applications are shown in FIGS. 10A-C. These samples show a relatively broad particle size distribution which is beneficial for bridging a wide distribution of pore throat diameters that are seen in real formations and were used as example materials.

Filter cake permeability was determined by plotting brine flow vs time through a filter cake formed in a 350 mL filter press. Results for three previously shown calcium carbonate samples is given in FIGS. 11A-C.

Figure 11A:
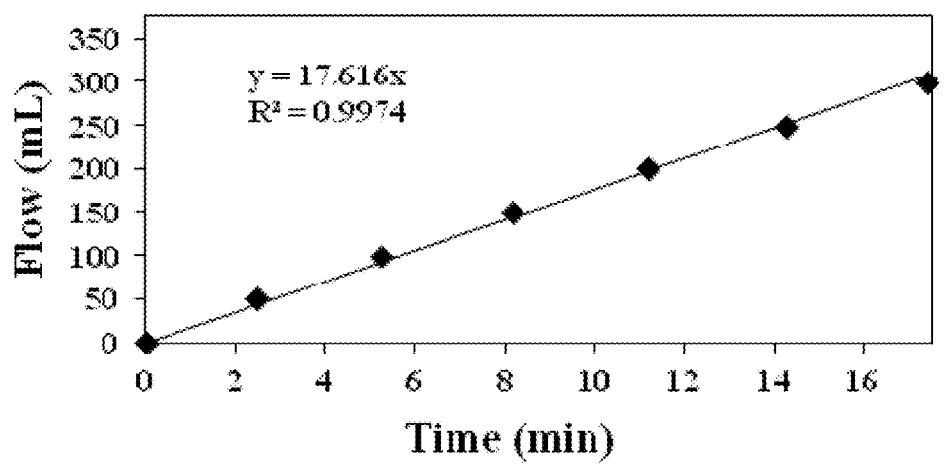
FIGS. 11A-C depicts a calculation of filter cake permeability from flow vs time data for the materials of FIGS. 10A-C.
Figure 11B:
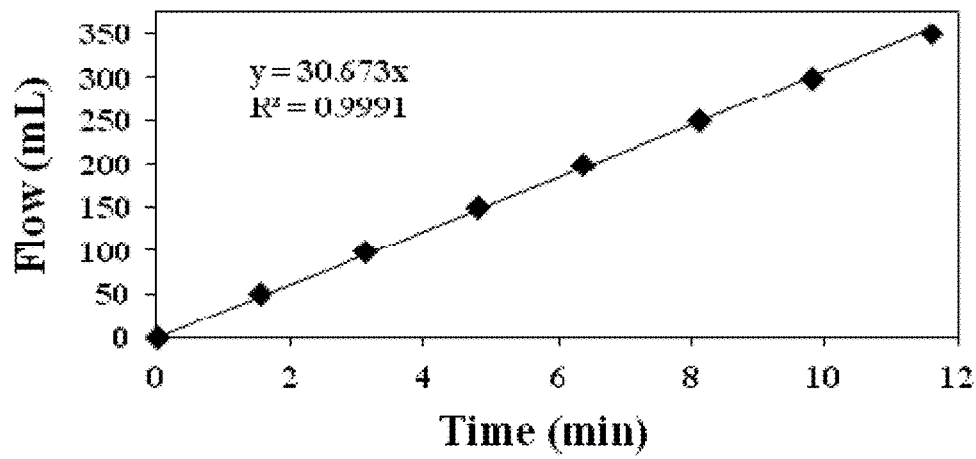
Figure 11C:
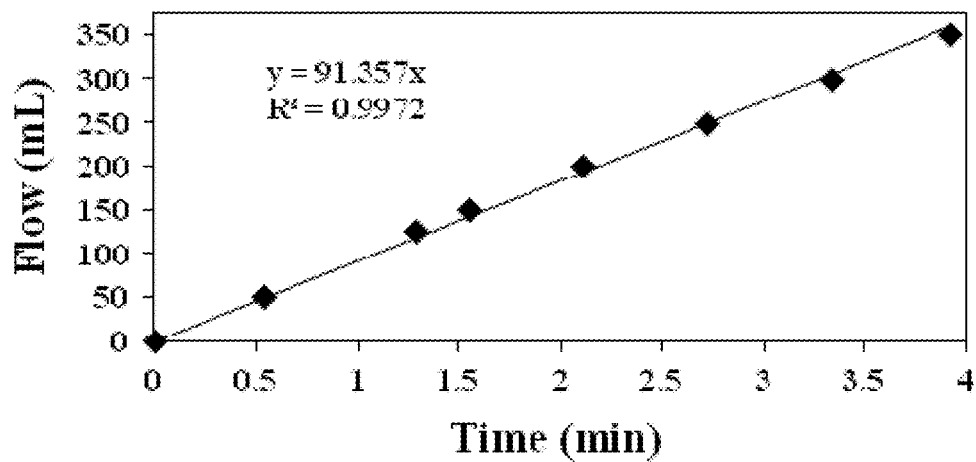

The results shown in FIGS. 11A-C clearly demonstrate that filter cake permeability may be controlled by choosing the correct particle size. Indeed, the targeted range of about 5 mD to about 50 mD was covered well with calcium carbonate $D_{50}$ having particles ranging from about 4 μm to about 40 μm. The substrate for these experiments was a ceramic disk with permeability of about 2500 mD indicating that the filter cake is capable of forming on high permeability zones.

Test Treatment Through Filter Cake

A method was developed to inject zeta potential or aggregation modifying agents, or other treatments, on-the-fly to create a turbulent environment to provide adequate mixing. The degree of turbulence in a flow path is principally determined by flow rate and pipe diameter (as well as fluid viscosity, pipe surface smoothness, and temperature). In order to generate turbulent flow, a lower inner-diameter capillary tube was used. Thus, sand control agents or treatments with reduced aqueous solubility would have to be injected on-the-fly at a high rate into a brine stream and flown through the filter cake as shown schematically in FIG. 12.

The sand control chemical was injected on the fly and passed through the filter cake in a modified filter press. The effluent was collected into a beaker containing sand and brine and the sand mixed manually. The results of this experiment clearly showed that the sand control agents penetrated the filter cake and were still capable of agglomerating sand afterwards.

Build a Model Horizontal Well Apparatus

Figure 13:
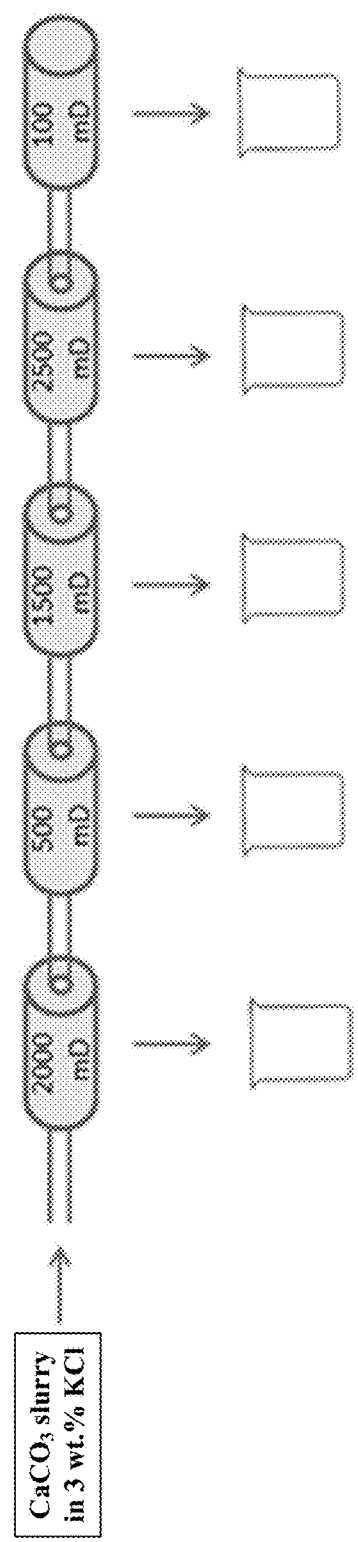
FIG. 13 depicts a general design of horizontal well model apparatus.

In order to test the feasibility of the diverting filter cake concept, we built an apparatus to model a horizontal well with zones having different permeabilities. The general design of the apparatus is shown in FIG. 13. Each zone in the well is modeled by a sandstone tube having a longitudinal hole drilled therethrough. The sandstone tubes were arranged in series and flow occurs horizontally through the core centers and radially outward through the body of each core. The core arrangement of FIG. 13 shows one of the most demanding horizontal well situations in which a high permeability zone (here a high permeability core) is located at the head of the well functioning as a large "thief-zone" stealing most of the treatment fluid. If a diverting filter cake functions adequately under these conditions, then it will be well suited for most other reservoir conditions.

Figure 14:
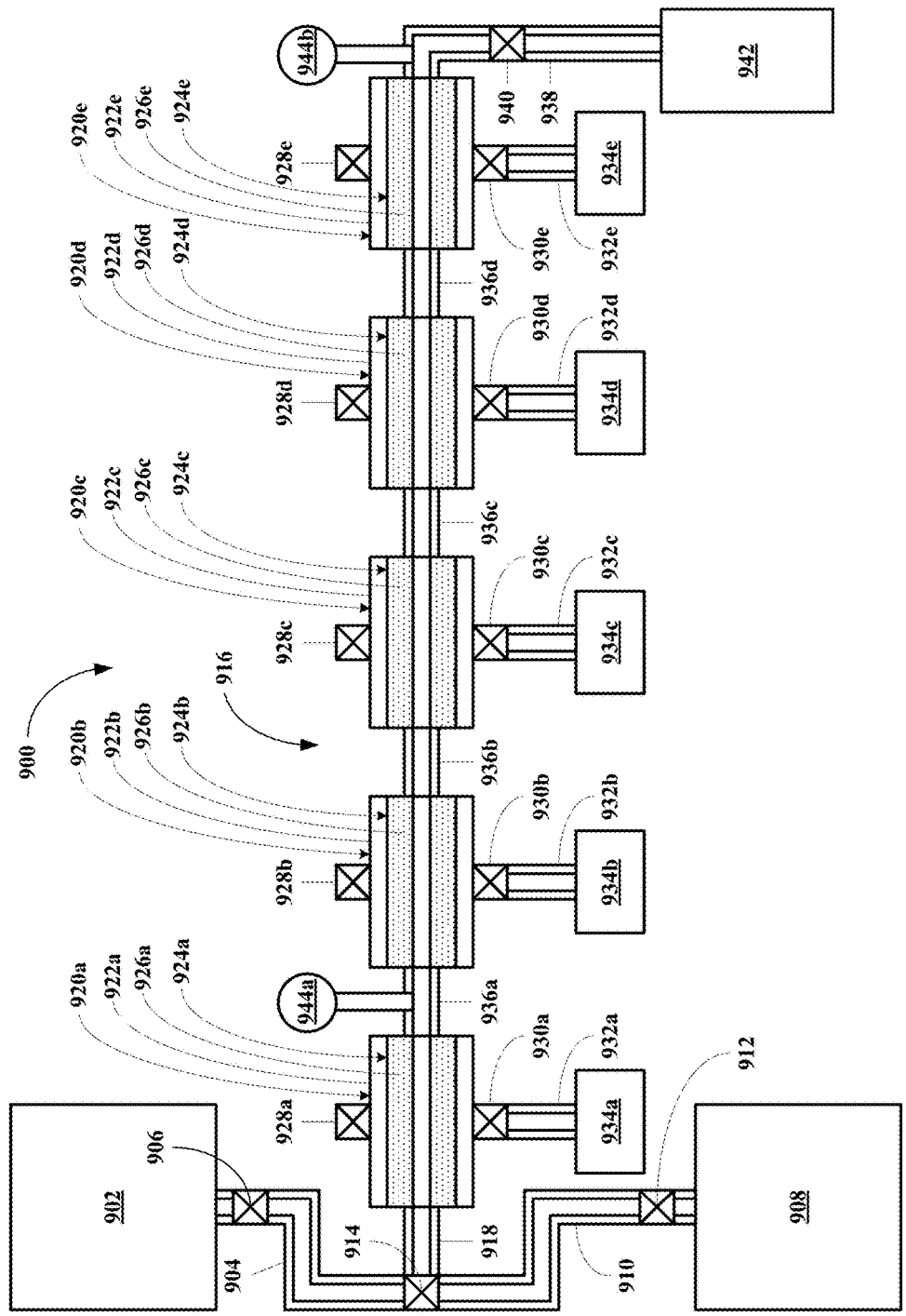
FIG. 14 depicts an embodiment of a model horizontal well apparatus.

Referring now to FIG. 14, an embodiment of the apparatus of FIG. 13, generally 900, is shown to include a fluid treatment reservoir 902 connected to a fluid delivery tube 904 including a fluid valve 906. The apparatus 900 also includes a filter material reservoir 908 connected to a slurry delivery tube 910 having a slurry valve 912. The tubes 904 and 910 are connected to a control valve 914 designed to permit either a fluid or a slurry to be directed into a horizontal well model section 916. The valve 914 is connected to the section 916 via inlet conduit 918. The section 916 includes five core assemblies 920a-e. The assemblies 920a-e include transparent outer layers 922a-e. Mounted in interiors 924a-e of the assemblies 920a-e are cores 926a-e having different permeabilities. The assemblies 920a-e also include top valves 928a-e and bottom valves 930a-e. The bottom valves 930a-e are connected via conduits 932a-e to flow collection containers 934a-e. The assemblies 920a-d are connected via interconnecting conduits 936a-d, while the assembly 920e is connected to an outlet conduit 938 having an outlet valve 940 leading to an outlet receiving container 942. The outer layers 922a-e of the assemblies 920a-e are constructed out of a clear material so that particulate flow may be visualized, are capable of withstanding up to 200 psi of pressure, and are capable of capturing the fluid flowing through each core. The clear material used here was machined clear polymethylmethacrylate (PMMA). The apparatus 900 also include one or more pressures sensors 944, here two 944a&b.

The apparatus 900 including the five zones of varying permeability is designed to collect flow-through liquid, which may be captured directly into contains such as beakers or may be routed through tubing attached to the valves around each core. The presence of the valves allows for flow to be directed to certain cores or through the end-valve. Pressure valves located at the beginning and end of the apparatus are used to calculate permeability changes throughout the process. A pump capable of flow-rates greater than 3 L/min is fed by a brine tank or from a mixing particulate slurry. A 3-way valve on the pump inlet allows pumping of either the brine or particulate slurry sequentially.

Using Model Apparatus

Three main steps were performed to show that effectiveness of the diverting filter cakes of this invention with the model apparatus. First, it was necessary to show that uneven flow patterns exist with the model apparatus using cores of different permeabilities. Second, it was necessary to show that the filter compositions of this invention form filter cakes on the bore through the cores leading to a more uniform or even flow through all of the cores. In certain embodiments, the filter cakes will form uniform or substantially uniform flow through all of the cores. Finally, it was necessary to show that the filter cakes erode or dissolve over time restoring the original permeabilities of the cores without permeability damage to the cores. In a typical experiment, a 3 wt. % KCl brine was pumped through the apparatus 100 for 2 min at a flow rate of about 3 L/min and flow through each core was collected and the pressure in the apparatus was measured. Measurement of pressure at the beginning and end of the apparatus showed that constant pressure was present along the entire system, because of the relatively small interval lengths. Equation 1 shows the calculation of permeability in a radial flow regime $$k = \frac{Q\mu \ln\left(\frac{r_o}{r_i}\right)}{2\pi h \Delta p}$$

where k is the permeability, Q is the flow rate, μ is the viscosity, $r_o$ is the outer radius, $r_i$ is the inner radius, h is the length of interval, and Δp is the differential pressure. Because permeability depends on fluid flow and differential pressure and pressure is the same at each core, fluid flow through each core is directly proportional to the permeability.

Figure 15:
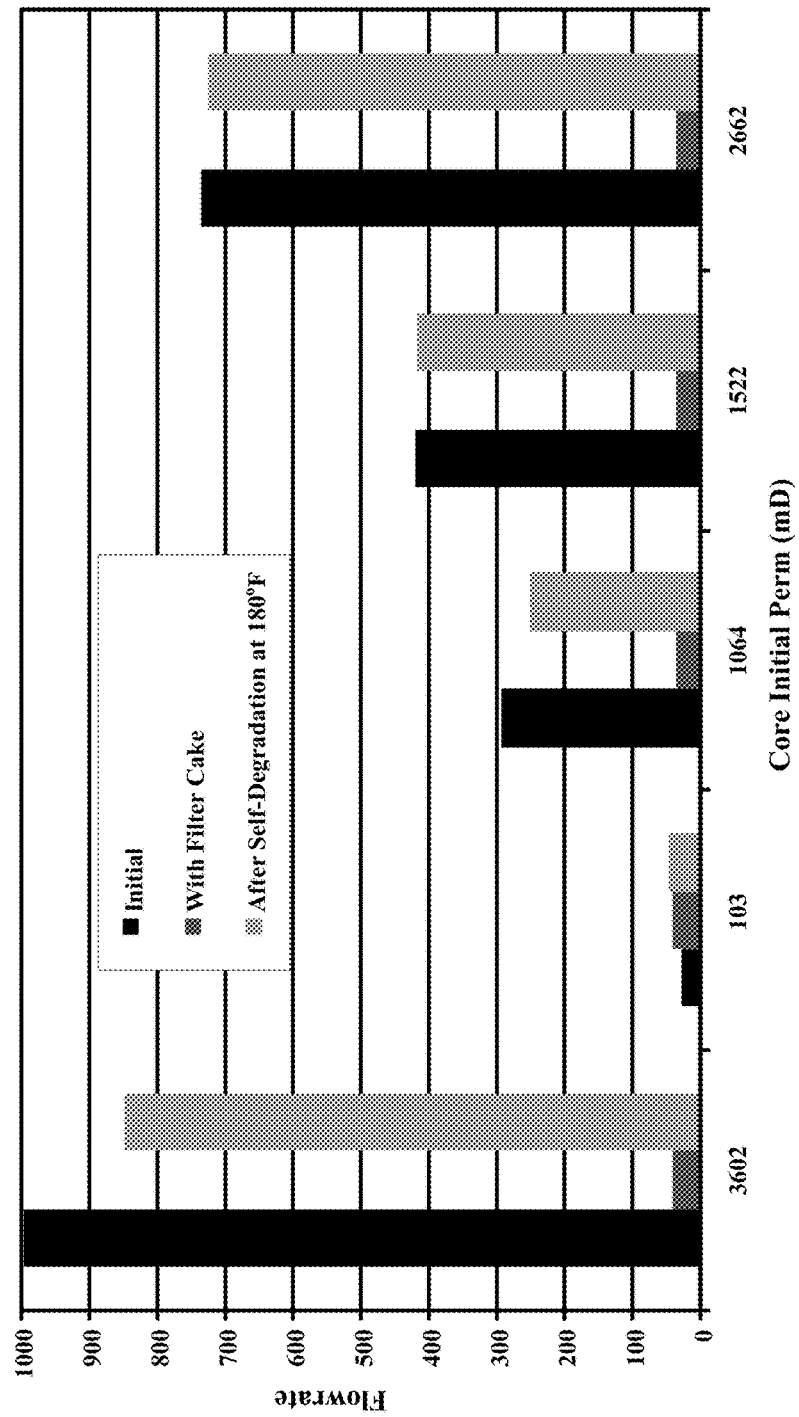
FIG. 15 depicts flow rates through each core initially, with a PLA filter cake, and again after an hour with filter cake.

After the initial flow and permeability values for each core were recorded, a particulate slurry is pumped to establish a filter cake on the interior surface of each core. In general, the particulate concentration was designed to be sufficiently high to allow effective bridging. In this case, 1 vol. % PLA was found to give good results. The pump rate was also adjusted to be sufficiently high to suspend the particulate properly; this value depends on particle size, density, and fluid viscosity. It was determined that 3 L/min was a sufficiently high pump rate. The pumping scheme is as follows: slurry and brine are pumped alternatively for 30 seconds each for a total of 5 minutes, then brine is pumped to clear out any suspended solids, and finally brine is pumped for 10 minutes and the amount of liquid produced over this time period is recorded. Next, the sandstone cores with filter cake were heated in brine at 180° F. for 3 days and then flow was recorded again. The results of these experiments are shown in FIG. 15 and show the uneven initial flow distribution due to the presence of 2 high permeability thief zones, the even distribution after filter cake formation, and the return to the original flow distribution after PLA hydrolysis was allowed to occur, demonstrating the success of the self-degradable filter cake concept. Because pressure was constant inside the apparatus, even flow through each core with the filter cake means that the effective permeability of each core was close to equal as shown in the following table.

| Initial Permeability (mD) | Permeability with Filter Cake |
|---|---|
| 3602 | 21.02 |
| 103 | 21.4 |
| 1064 | 18.9 |
| 1522 | 18.2 |
| 2662 | 19.0 |

It may also not be necessary to form a filter cake evenly along the entire wellbore as it may be sufficient to bring the permeability of the higher permeability segments near to the level of the lowest permeability segments. A real well may also have larger cracks, fractures, etc. on which it would be impossible to form a filter cake with small size particulate. In such scenarios, it may be necessary to use a graded pumping regime starting with large diameter material and working down to particle sizes sufficient to even out the flow profile across the formation.

EXAMPLES

Test Filter Cake Formation and Permeability

Figure 16:
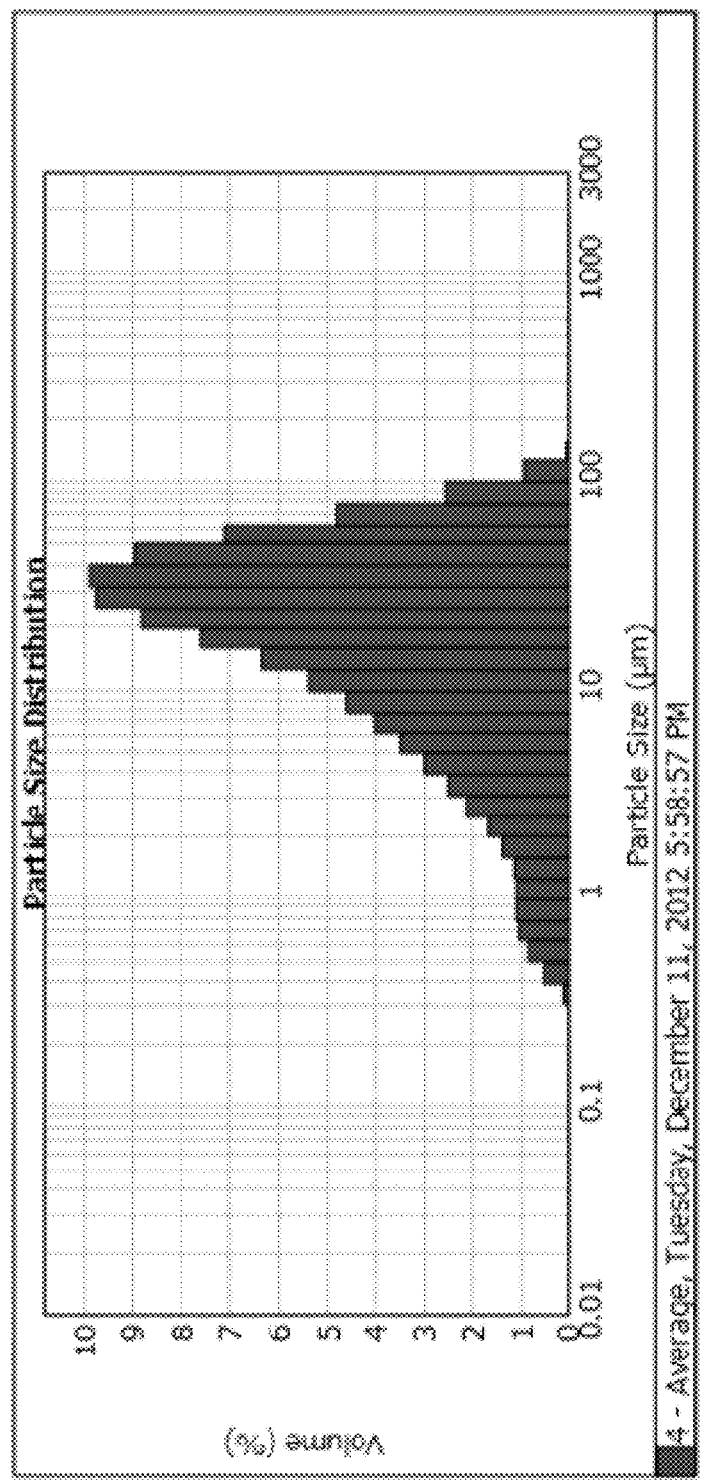
FIG. 16 depicts a PLA PSD.

Samples of Wel-Carb 2, 5, 20, 25, and 50 were obtained from Imerys. FIG. 16 shows the particle size distribution of Wel-Carb 20.

Filter cake permeability was determined by weighing 8 g of calcium carbonate and adding it directly to a filter press having about a 2500 mD ceramic disk. Brine was added and particulate was manually mixed with a spatula. Brine (at least 350 mL) was passed under atmospheric pressure through the filter press to form the filter cake. Once formed, a volume of brine in the filter press was constantly topped off to maintain the volume at about 350 mL while the volume flowing through the filter press was recorded. The pressure due to gravity and the flow rate was calculated and Darcy's law was used to calculate the permeability. The flow-through filter press apparatus was found to be the easiest method to achieve constant flow or pressure through the filter cake.

Treatment Through Filter Cake

Figure 12:
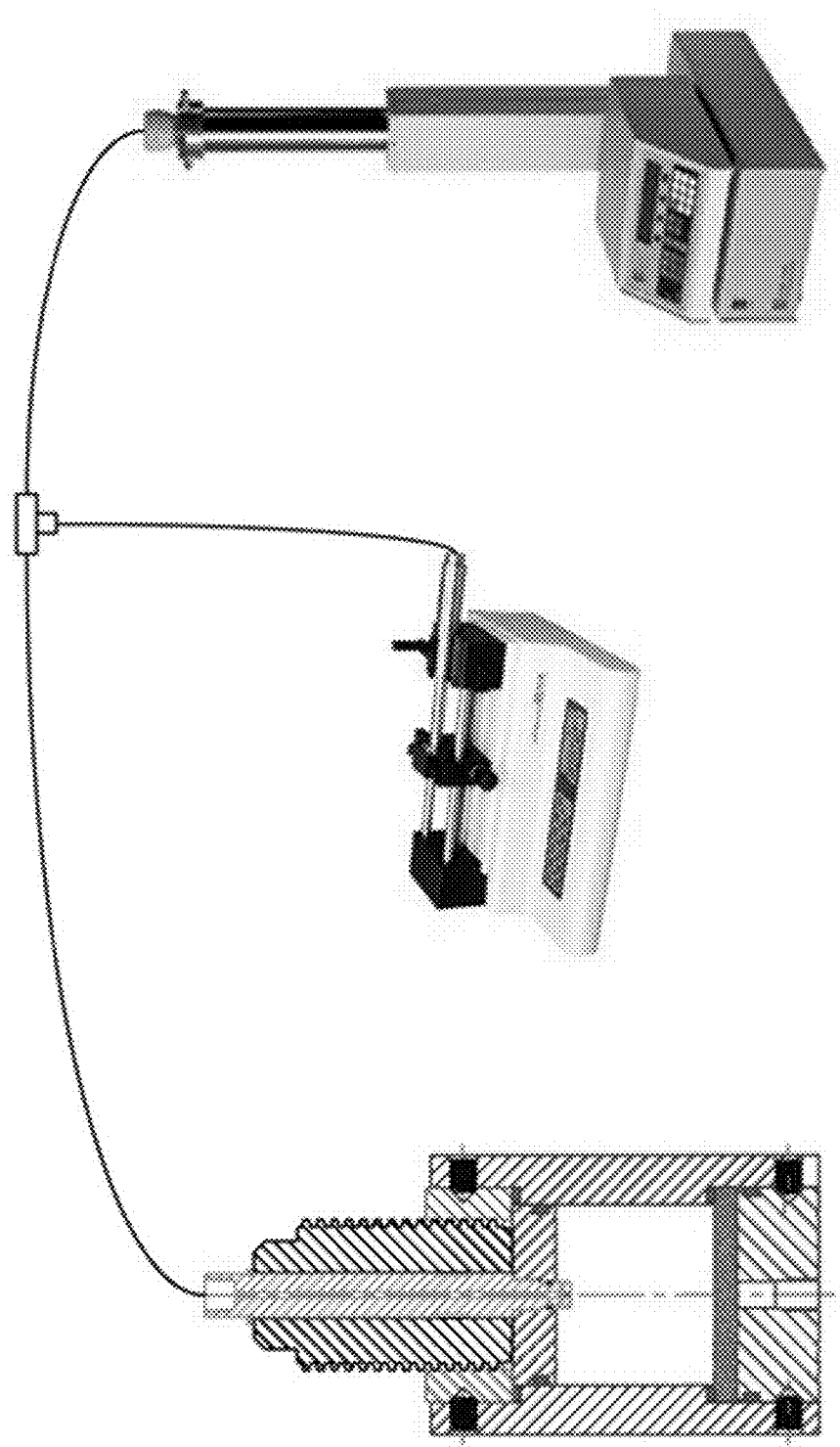
FIG. 12 depicts a filter cake after on-the-fly zeta potential or aggregation modifying agent treatment (left) and sand agglomerated by zeta potential or aggregation modifying agent passing through filter cake (right).

On-the-fly injection of a treatment through the filter cake was carried out using a 100 mL filter press modified with a flow-through piston attachment as shown in FIG. 12. 5 g of PLA were added directly to the filter press with about a 2500 mD ceramic disk followed by brine, which was then mixed to suspend the solid. The set-up was heated to 180° F. Next brine was passed through the apparatus at 20 mL/min for a total of 100 mL to form the filter cake. Next, a sand control agent (SandAid) was injected on the fly at 10 vol. % concentration until SandAid droplets began to elute from bottom of filter press. The sand control chemical was stirred with sand, demonstrating retention of sand aggregation ability.

Build Horizontal Well Model Apparatus

Assembly of apparatus of FIG. 14: Cores were washed to remove drilling fines and allowed to dry. End pieces were attached to the cores by placing clear silicone RTV onto the end piece and carefully inserting onto core and squeezing down by hand. After one end piece is attached, the process is repeated on the other side. RTV is allowed to set for 24 hours before continuing.

O-rings are inserted into the plastic core-holder sections and the cores are inserted with some lubricant added to sides of plastic core end-pieces to aid insertion. Apparatus is then assembled by alternating one core-holder and one intermediate piece. Stainless steel threaded rods are used to hold the apparatus together as shown in FIG. 14 and are tightened enough to seal the flange O-rings. Plastic nipples are attached to threaded openings in core-holder sections and stainless steel valves are attached to those. End-flanges with appropriate fittings are attached to ends of the apparatus. Pressure gauges are placed at the start of the apparatus and at each connecting tube as desired. Valves were placed to allow flow through the end of the apparatus and to divert flow at the start of the apparatus. A gear pump and inverter motor capable of about 15 L/min flow rate was used. A pressure-release valve (150-200 psi max pressure) must be used to prevent unsafe rise in pressure.

Using Model Apparatus

Procedure for filter cake formation in long-horizontal well model apparatus: 60 L of 3 wt. % KCl brine was made up and transferred to holding tank. 10 L of 1 volume % PLA slurry was made up and stirred with a large mixing blade. A 3-way valve was used to feed either brine or PLA slurry into the apparatus at a pump rate of 15 Hz. Initial flow and permeability was measured by flowing brine a 3 L/min for 2 min and measuring the effluent from each core. Next, PLA slurry and brine were alternatively pumped for 30 seconds each for a total of 5 min and brine was pumped for 1 more minute. After this, the flow from each core was measured for 10 min.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for diverting well treatments comprising:
   introducing a layer forming composition into a wellbore drilled into a geological structure, wherein the layer forming composition comprises self-degradable particulate materials having a particle size distribution of 0.1 microns to 800 microns and a concentration in the layer forming composition of 0.1 vol % to 60 vol %;
   forming a filter cake comprising the self-degradable particulate materials on a downhole surface, wherein the filter cake has an initial effective permeability of 1 mD to 100 mD along the downhole surface without sealing the downhole surface, and wherein the downhole surface is selected from the group consisting of: (a) on a formation surface, on an interval surface, on a well screen assembly surface, on a gravel pack surface, and/or on a sand pack surface associated with the formation surface or the interval surface and (b) between the formation surface or the interval surface and a production tubing or working string, wherein the downhole surface before forming the filter cake has at least one high permeability zone having a permeability of 100 mD to 3000 mD;

pumping a treating fluid into the well through the filter cake; and after treatment, allowing the filter cake to degrade over time to restore original permeabilities of the downhole surface.

2. The method of claim 1, further comprising:

isolating the interval using an isolation packer or a plurality of packers prior to forming the filter cake.

3. The method of claim 1, wherein the particulate materials have a D50 of 4 microns to 40 microns and the initial effective permeability of the filter cake is 5 mD to 50 m.

4. The method of claim 3, wherein the particulate materials comprise self-degrading materials comprise hydrolytically degradable materials, formation-fluid dissolving materials, slow-dissolving materials, thermally unstable materials, or mixtures and combinations thereof.

5. The method of claim 4, wherein the self-degrading materials are selected from the group consisting of polysaccharides; chitin; chitosan; proteins; aliphatic polyesters; poly(lactides); poly(glycolides); poly(ε-caprolactones); poly(hydroxybutyrates); aliphatic polycarbonates; poly(orthoesters); poly(amides); poly(urethanes); poly(hydroxy ester ethers); poly(anhydrides); poly(amino acids); poly(ethylene oxide); and polyphosphazenes.

6. The method of claim 4, wherein the self-degrading materials are selected from the group consisting of polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid), poly(amino acids), poly(methyl vinyl ether), poly(maleic anhydride), chitin, chitosan, and copolymers, terpolymers, or higher poly-monomer polymers thereof or combinations or mixtures thereof.

7. The method of claim 4, wherein the self-degrading materials are selected from the group consisting of polyanhydrides, polyorthoesters, poly(l-lactic acid) (PlLA), poly(dl-lactic acid) (PLA), poly(glycolic acid) (PGA), polycaprolactones, copolymers, terpolymer, higher poly-monomer polymers thereof, or combinations or mixtures thereof.

8. The method of claim 4, wherein the self-degrading materials are selected from the group consisting of copolymers of lactic acid and glycolic acid (poly(dl-lactic-co-glycolic acid) (PLG)) having a co-monomer (lactide:glycolide) ratio of between about 100:0 and about 50:50 lactic acid to glycolic acid.

9. The method of claim 1, wherein the well treatments are selected from the group consisting of a sand control treatment, an aggregating (lactide:glycolide) ratio of between about 100:0 and about 50:50 lactic acid to glycolic acid.

10. The method of claim 1 further comprising:

introducing particles having a particle size distribution of 1 mm to 3 mm into the wellbore before introducing the self-degradable particulate materials.

11. A system for diverting well treatments comprising:

a source subsystem comprising a filter cake composition reservoir, a treating composition reservoir, and a control valve, wherein the filter cake reservoir contains a filter cake forming composition that comprises self-degradable particulate materials having a particle size distribution of 0.1 microns to 800 microns and a concentration in the filter cake forming composition of 0.1 vol % to 60 vol %, wherein the treating fluid reservoir contains a treating fluid, and wherein the control valve is designed to switch between the filter cake composition reservoir and the treating fluid reservoir;

a filter-cake placement subsystem comprising a pump and a slurry delivery tube including a slurry valve for placing a filter cake comprising the self-degradable particulate materials, when the control valve is set to permit delivery of the filter cake forming composition through the slurry delivery tube and the slurry valve, on a downhole surface, wherein the filter cake has an initial effective permeability of 1 mD to 100 mD along the downhole surface without sealing the downhole surface, and wherein the downhole surface is selected from the group consisting of (a) on surfaces of a producing formation, interval, or intervals, (b) on surfaces of an injection formation, interval, or intervals, (c) in an annular space between the formation surfaces or interval surfaces and a production tubing surface, (d) on surfaces of a screen assembly, (e) on surfaces of a gravel and/or (f) on surfaces of a sand pack, wherein the formation, interval, or intervals, and wherein the downhole surface before forming the filter cake has at least one high permeability zone having a permeability of 100 mD to 3000 mD; and an injection subsystem comprising the pump and a fluid delivery tube including a fluid valve for injecting, when the control valve is set to permit the treating fluid to flow through the fluid delivery tube and the fluid valve, for injection a treating fluid through the filter cake and wherein, after treatment, the filter cake degrades over time to leave the surfaces substantially unharmed and to restore original zone permeabilities of the downhole surface.

12. The system of claim 11, further comprising:

a well screen assembly, a gravel pack, or a sand pack associated with the formation, the interval, or the intervals, and wherein the filter cake is formed on a surface or surfaces of the screen assembly, the gravel pack or the sand pack or pass through the assembly or packs and is formed between the assembly or the packs and the surface or the surfaces of the formation, the interval, or the intervals or is formed in a lower portion of the assembly or the packs.

13. The system of claim 11, further comprising:

a packer or a plurality of packers to isolate the formation, the interval or the intervals, and a work string or production tubing.

14. The system of claim 11, wherein the self-degradable particulate materials have a D50 of 4 microns to 40 microns and the initial effective permeability of the filter cake is 5 mD to 50 mD.

15. The system of claim 14, wherein the particulate materials comprise self-degrading materials comprise hydrolytically degradable materials, formation-fluid dissolving materials, slow-dissolving materials, thermally unstable materials, or mixtures and combinations thereof.

16. The system of claim 15, wherein the permeability of the filter cake changes over time as the materials degrade, eventually being substantially or completely removed from the surfaces.

17. The system of claim 14, wherein the self-degrading materials are selected from the group consisting of polysaccharides; chitin; chitosan; proteins; aliphatic polyesters;

poly(lactides); poly(glycolides); poly(ε-caprolactones); poly(hydroxybutyrates); aliphatic polycarbonates; poly(orthoesters); poly(amides); poly(urethanes); poly(hydroxy ester ethers); poly(anhydrides); poly(amino acids); poly(ethylene oxide); and polyphosphazenes.

18. The system of claim 14, wherein the self-degrading materials are selected from the group consisting of polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid), poly(amino acids), poly(methyl vinyl ether), poly(maleic anhydride), chitin, chitosan, and copolymers, terpolymers, or higher poly-monomer polymers thereof or combinations or mixtures thereof.

19. The system of claim 14, wherein the self-degrading materials are selected from the group consisting of polyanhydrides, polyorthoesters, poly(l-lactic acid) (PILA), poly(dl-lactic acid) (PLA), poly(glycolic acid) (PGA), polycaprolactones, copolymers, terpolymer, higher poly-monomer polymers thereof, or combinations or mixtures thereof.

20. The system of claim 14, wherein the self-degrading materials are selected from the group consisting of copolymers of lactic acid and glycolic acid (poly(dl-lactic-co-glycolic acid) (PLG)) having a co-monomer treatment, a zeta modifying treatment, a sticky/tacky material treatment, a sand consolidation/formation consolidation treatment, an in situ polymerizable formation consolidate treatment, a scale inhibitor treatment, a paraffin inhibitor treatment, a wettability modifier treatment, a biocide treatment, a gel breaker treatment, an enzyme treatment, a defoamer treatment, an acid treatment, and mixtures or combinations thereof.

21. The system of claim 11, wherein the well treatments are selected from the group consisting of a sand control treatment, an aggregating treatment, a zeta modifying treatment, a sticky/tacky material treatment, a sand consolidation/formation consolidation treatment, an in situ polymerizable formation consolidate treatment, a scale inhibitor treatment, a paraffin inhibitor treatment, a wettability modifier treatment, a biocide treatment, a gel breaker treatment, an enzyme treatment, a defoamer treatment, an acid treatment, and mixtures or combinations thereof.

* * * * *